United States Patent
Wang et al.

(10) Patent No.: US 10,798,779 B2
(45) Date of Patent: Oct. 6, 2020

(54) ENHANCED COAP GROUP COMMUNICATIONS WITH SELECTIVE RESPONSES

(71) Applicant: Convida Wireless, LLC, Wilmington, DE (US)

(72) Inventors: Chonggang Wang, Princeton, NJ (US); Rocco Di Girolamo, Laval (CA); Shamim Akbar Rahman, Cote St. Luc (CA); Xu Li, Plainsboro, NJ (US); Zhuo Chen, Claymont, DE (US); Quang Ly, North Wales, PA (US); Vinod Kumar Choyi, Conshohocken, PA (US); Lijun Dong, San Diego, CA (US)

(73) Assignee: Convida Wireless, LLC, Wilmington, DE (US)

( * ) Notice: Subject to any disclaimer, the term of this patent is extended or adjusted under 35 U.S.C. 154(b) by 173 days.

(21) Appl. No.: 15/752,459

(22) PCT Filed: Aug. 12, 2016

(86) PCT No.: PCT/US2016/046734
§ 371 (c)(1),
(2) Date: Feb. 13, 2018

(87) PCT Pub. No.: WO2017/030943
PCT Pub. Date: Feb. 23, 2017

(65) Prior Publication Data
US 2019/0014615 A1    Jan. 10, 2019

Related U.S. Application Data

(60) Provisional application No. 62/205,018, filed on Aug. 14, 2015.

(51) Int. Cl.
| | |
|---|---|
| *H04W 80/12* | (2009.01) |
| *H04W 4/70* | (2018.01) |
| *H04L 12/18* | (2006.01) |
| *H04W 4/06* | (2009.01) |
| *H04L 29/12* | (2006.01) |

(Continued)

(52) U.S. Cl.
CPC .......... *H04W 80/12* (2013.01); *H04L 12/185* (2013.01); *H04L 12/1872* (2013.01);
(Continued)

(58) Field of Classification Search
None
See application file for complete search history.

(56) References Cited

U.S. PATENT DOCUMENTS

| | | | | |
|---|---|---|---|---|
| 2012/0124372 A1* | 5/2012 | Dilley | ................. | H04L 67/2819 713/162 |
| 2014/0304381 A1* | 10/2014 | Savolainen | ......... | H04L 41/0806 709/222 |
| 2019/0230167 A1* | 7/2019 | Laari | ....................... | H04L 12/66 |

OTHER PUBLICATIONS

Vida et al., "Multicast Listener Discovery Version 2 (MLDv2) for IPv6", IETF RFC 3810, Jun. 2004, 63 Pages.
(Continued)

*Primary Examiner* — Alex Skripnikov
(74) *Attorney, Agent, or Firm* — BakerHostetler

(57) ABSTRACT

Multicast messaging may be managed in a machine-to-machine/Internet of things context, such as a CoAP network, via the inclusion of server selection criterion in multicast request messages and/or resource directory registration management. Server selection criteria may be explicit or implicit. An explicit criterion may be expressed, for example, as an IP address, a server identifier relative to a group context, or a Bloom filter. An implicit criterion may, for example, relate to the context of the request or the requestor, and include such information as data accuracy, data type, application, operating system, network location, geolocation, resource creation time, and resource update time. Server selection criteria may be maintained by a resource directory and/or via a user interface.

20 Claims, 22 Drawing Sheets

(51) Int. Cl.
H04L 29/08 (2006.01)
H04W 48/08 (2009.01)
H04W 84/18 (2009.01)

(52) U.S. Cl.
CPC ......... *H04L 61/6059* (2013.01); *H04L 67/12* (2013.01); *H04W 4/06* (2013.01); *H04W 4/70* (2018.02); *H04W 48/08* (2013.01); *H04L 67/327* (2013.01); *H04W 84/18* (2013.01)

(56) References Cited

OTHER PUBLICATIONS

Shelby, "CoRE Resource Directory; draft-ietf-core-resource-directory-04.txt", Internet Engineering Task Force, IETF; Standard Working Draft, (ISOC), Jul. 6, 2015, pp. 1-49.

Shelby, "Constrained RESTful Environments (CoRE) Link Format" Internet Engineering Task Force (IETF) RFC 6690, Aug. 7, 2012, 22 Pages.

Shelby et al., "The Constrained Application Protocol (CoAP)" IETF RFC 7252, Jun. 2014, 113 Pages.

Shelby et al., "Neighbor Discovery Optimization for IPv6 over Low-Power Wireless Personal Area Networks (6LoWPANs)" Internet Engineering Task Force (IETF) RFC 6775, Nov. 2012, 56 pages.

Shelby et al., "CoRE Resource Directory draft-ietf-core-resource-directory-00" Jun. 3, 2013, 27 Pages.

Rahman et al., "Group Communication for the Constrained Application Protocol (CoAP)", Internet Engineering Task Force (IETF) RFC 7390, Oct. 2014, 46 Pages.

Broder et al., "Network Applications of Bloom Filters: A Survey", Internet Mathematics, vol. I, No. 4, 2003, pp. 485-509.

Boivie et al., "Explicit Multicast (Xcast) Concepts and Options" IETF Network Working Group RFC 5058, Nov. 2007, 36 Pages.

* cited by examiner

ENHANCED COAP GROUP COMMUNICATIONS WITH SELECTIVE RESPONSES

CROSS-REFERENCE TO RELATED APPLICATIONS

This Application is a National Stage Application filed under 35 U.S.C. § 371 of International Application No. PCT/US2016/046734 filed Aug. 12, 2016, which claims the benefit of U.S. Provisional Application No. 62/205,018, filed on Aug. 14, 2015 entitled "Enhanced COAP Group Communications with Selective Responses", the content of which is hereby incorporated by reference in its entirety.

BACKGROUND

Machine-To-Machine (M2M), Internet-of-Things (IoT), and Web-of-Things (WoT) network deployments may employ group communications between nodes such as M2M/IoT/WoT servers, gateways, and devices which host M2M/IoT/WoT applications and services. Such network deployments may include, for example, constrained networks, wireless sensor networks, wireless mesh networks, mobile ad-hoc networks, and wireless sensor and actuator networks. These may use various protocols, such as IPv6 over Low-Power Wireless Personal Area Networks (6LoWPAN), Constrained Application Protocol (CoAP), CoRE Link Format, Neighbor Discovery Protocol, and Constrained RESTful Environments (CoRE) Resource Directory (RD), and include such devices as constrained devices, sensor nodes, actuator nodes, medical devices, CoAP clients such as gateways, and network applications servers.

SUMMARY

Described herein are systems and methods whereby, in M2M/IoT/WoT networks such as CoAP networks, multicast requests include information to implicitly or explicitly indicate which servers should respond, allowing servers to selectively respond. Explicit server indication may be in the form of IP addresses, group member identifiers, or a Bloom filter, for example. Implicit server indication may be in the form of context indication information which represents a requirement or expectation of the client device. Each server determines independently whether it needs to send a response. A client device may track groups of servers it discovers based on contextual requirements. Such context-aware group management may also be facilitated using resource directories, whereby a resource directory node may create context-aware groups according to the requirements of one or more client devices, and/or according to server capabilities. The methods may be implemented in a variety of environments, including, but not limited to 6LoWPAN, CoAP, and CoRE.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

The summary, as well as the following detailed description, is further understood when read in conjunction with the appended drawings. For the purpose of illustrating the invention, there are shown in the drawings exemplary embodiments of the invention; however, the invention is not limited to the specific methods, compositions, and devices disclosed.

DETAILED DESCRIPTION OF ILLUSTRATIVE EMBODIMENTS

Multicast messaging may be managed in a machine-to-machine/Internet of things/web-of-things context, such as a CoAP network, via the inclusion of server selection criterion in multicast request messages and/or resource directory registration management. Server selection criteria may be explicit or implicit. An explicit criterion may be expressed, for example, as an IP address, a server identifier relative to a group context, or a Bloom filter. An implicit criterion may, for example, relate to the context of the request or the requestor, and include such information as data accuracy, data type, application, operating system, network location, residual battery, network and/or link congestion, mobility status, geolocation, resource creation time, and resource update time. Server selection criteria may be maintained by a resource directory and/or via a user interface.

Figure 1:
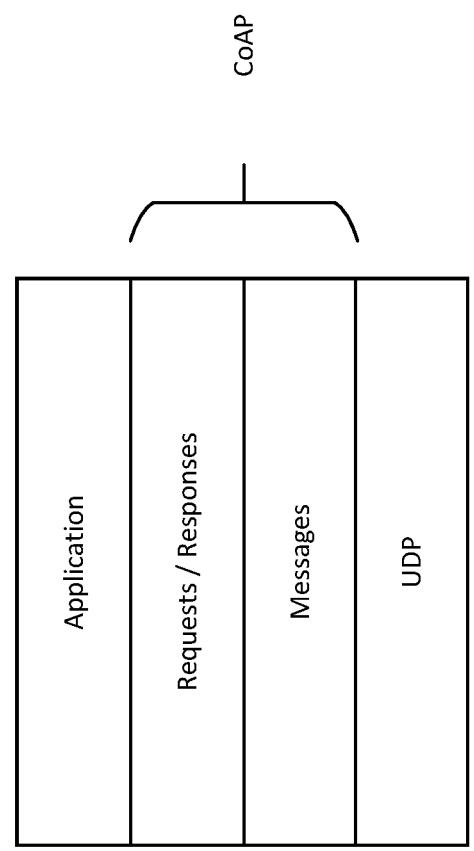
FIG. 1 depicts abstract layers of a CoAP network.
Figure 2:
FIG. 2 is a call flow diagram showing an example of a CoAP request and response.

As described in Internet Engineering Task Force (IETF) RFC 7252, Constrained Application Protocol (CoAP) is a protocol for constrained networks. It specifies interactions among network devices, known as CoAP endpoints. CoAP utilizes representational state transfer (REST) methods in accordance with Constrained RESTful Environments (CoRE). CoAP runs above User Datagram Protocol (UDP) layer. The interaction model of CoAP is similar to the client/server model of Hypertext Transfer Protocol (HTTP). CoAP may be envisioned as using a two-layer approach as shown in FIG. 1. In particular, a CoAP message layer deals with UDP while the request/response layer deals with the asynchronous nature of the RESTful interactions. However, CoAP is a single protocol in the sense that the logical messages layer and the request/response layer are just features of the CoAP header.

A CoAP client is an endpoint originating a request and receiving the associated response. A CoAP server is an endpoint receiving a request and sending the associated response. A CoAP management entity is a logical entity that may configure and manage functionality of the CoAP protocol.

CoAP request and response semantics are carried in RESTful CoAP messages which include either a method code for a request message (e.g., GET, POST, PUT or DELETE) or a Response code for a response message, respectively. Optional or default request and response information, such as the uniform resource identifier (URI) and payload media type, are carried as CoAP options. A token is used to match responses to requests independently from the underlying messages. A request may be carried in a confirmable message (CON) or non-confirmable message (NON). If the request is carried in a CON and the response is immediately available, the response is carried in the resulting acknowledgement message (ACK). This is called a "piggy-backed" response. If a request is sent in a NON message, then the response is sent using a new NON.

CoAP is layered over UDP, and UDP communications may not be reliable. To compensate, CoAP may include mechanisms to ensure reliable message transmission. Each CON message includes a message ID, and the message may be retransmitted until the sender either receives an ACK from the recipient, or the sender reaches a maximum number of retransmissions or a retransmission timeout, with exponential back-off between retransmissions. For each new CON message, the sender chooses an initial timeout, e.g., based on the ACK_TIMEOUT transmission parameter. The sender also sets a retransmission counter to 0. If the timeout is triggered and the retransmission counter is less than MAX_RETRANSMIT, the sender will retransmit the CON message, including the original message ID, increment the retransmission counter, and double the timeout value. If the retransmission counter equals MAX_RETRANSMIT, the message transmission is cancelled and the application may be notified. The default values for ACK_TIMEOUT and MAX_RETRANSMIT are 2 seconds and 4 seconds, respectively.

Responses may be synchronous or asynchronous. The synchronous case is where the answer to a request is immediately available. The asynchronous case is where the content to be included in the response to a received request is not immediately available so that the response will be sent back at a later time.

The IETF Constrained RESTful Environment (CoRE) Resource Directory draft specifies certain web interfaces that a Resource Directory (RD) will support in order for web servers to discover the RD, and to register, maintain, lookup, and remove resource descriptions, as well as certain link attributes for the RD.

Figure 3:
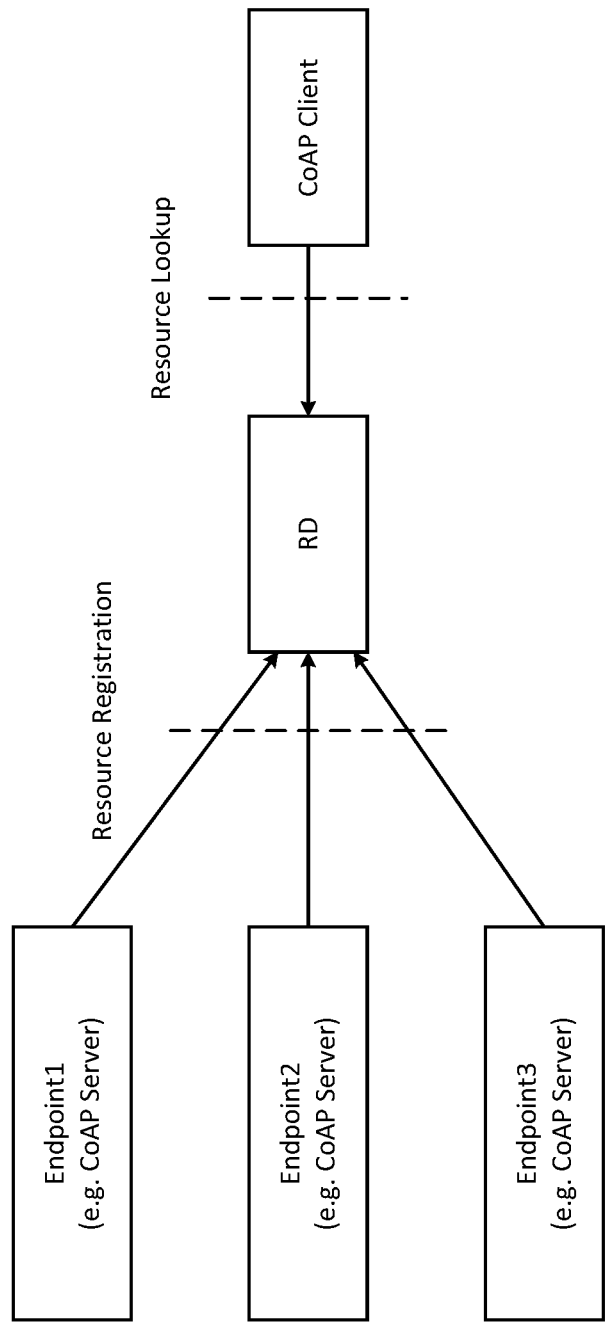
FIG. 3 is a schematic view of an example system using a CoRE resource directory (RD.)

FIG. 3 shows an example RD architecture. Here, an RD is used as a repository for web links or attributes about resources hosted on endpoint web servers such as CoAP servers. Each endpoint is associated with a port. A single physical node may host one or more endpoints. The RD implements a set of REST interfaces for endpoints to register and maintain sets of web links, which are called resource directory entries or resource records. The RD may validate the directory entries, and clients may lookup resources in the directory. Endpoints themselves may also act as clients.

Endpoints may proactively register and maintain resource directory entries on the RD. Directory entries are soft state and need to be periodically refreshed. An endpoint may be provided with interfaces to register, update, and remove a resource directory entry. Furthermore, a mechanism to discover an RD is defined in IETF RFC 6690, Constrained RESTful Environment (CoRE) Link Format. A lookup interface for discovering any of the web links held in an RD is provided using the CoRE Link Format.

CoAP also supports point-to-multipoint group communications as defined in IETF RFC 7390. This includes mechanisms for configuring group membership, issuing group communication request messages, and generating the corresponding response messages. Under IETF RFC 7390, CoAP group communication is defined as when a source node. e.g., a CoAP client, sends a single CoAP message to multiple destination nodes, e.g., CoAP servers, where all destinations are identified as belonging to a specific group. The source node itself may be part of the group. The underlying mechanisms for CoAP group communication are UDP/IP multicast for the requests and unicast UDP/IP for the responses.

In the rest of this disclosure, the terms "group communications" and "multicast" are used interchangeably. Similarly, as applied to logical entities, the terms "node" and "device" are synonymous unless noted to the contrary.

An example of group communications would be a light switch incorporating a CoAP client that turns on or off multiple lights in a room with a single CoAP PUT request, and then handles the potential multitude of unicast responses. RFC 7252 defines a few basic CoAP multicast operations, including ignorable requests and delayed unicast responses. A CoAP server may, for example, ignore any request that has an empty payload or contains only an error response. Further, if a CoAP server does decide to respond to a multicast request, it should not respond immediately. Rather, it should pick a duration for the period of time during which it intends to respond.

Under CoRE Link Format, group membership configuration includes providing member nodes with an IP multicast address or a Fully Qualified Domain Name (FQDN) name. Preconfigured group information, in the form of an IP multicast address or a FQDN, may be provided to a CoAP Server. A CoAP Server may also discover such information by looking up its group membership, including the corresponding IP multicast address, using techniques such as a CoAP resource directory.

One node may have its group membership configuration established via another node, such as a commissioning device. IETF RFC 7390 describes dynamic commissioning tools which may determine one or more groups to which a CoAP server belongs, and provide this information to the CoAP server. The server may then subsequently join the correct IP multicast groups via its network interface. RFC 7390 defines the following operations for a CoAP server: creating a new multicast group membership; deleting a single group membership; reading a single group membership; reading all group memberships at once; updating a single group membership; and creating or updating all group memberships at once.

Figure 4:
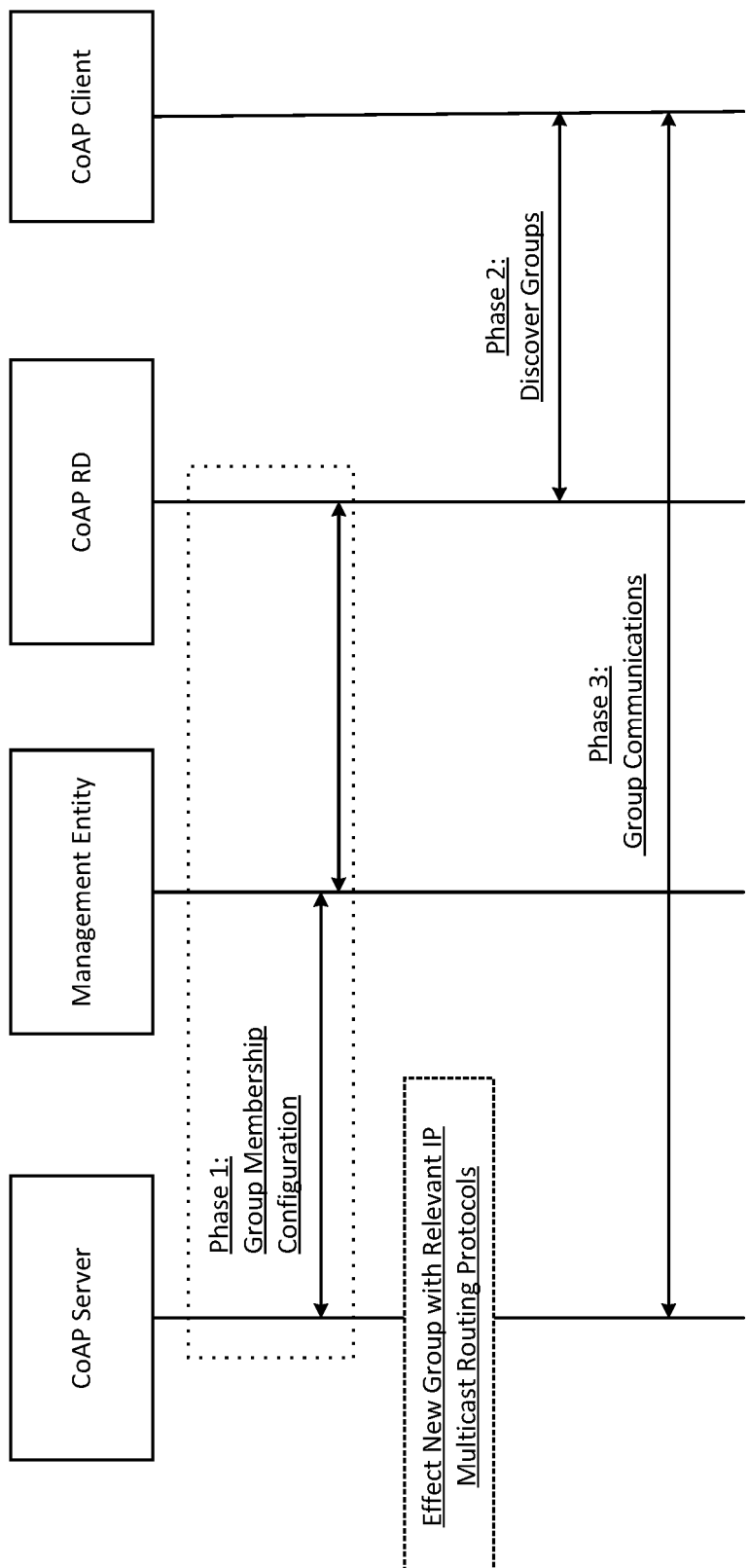
FIG. 4 is an example call flow diagram showing an overview of CoAP group communications.

FIG. 4 illustrates example overall procedures of CoAP multicast according to protocols such, as IETF RFC 6690 Constrained RESTful Environment (CoRE) Link Format. In phase 1 of FIG. 4, a management entity configures CoAP server by exchanging group membership information, such as IP multicast addresses and/or FQDN names. The management entity also registers such membership information with a CoAP RD, which a CoAP client may discover later in phase 2. CoAP servers may create new group memberships using an IP multicast routing protocol, e.g., via IETF RFC 3810 Multicast Listener Discovery Version 2 (MLDv2) for IPv6. In other words, a CoAP server may use MLD protocol, for example, to report its membership in a group associated with a particular IP multicast address to its neighboring routers, so that they know the existence of such membership and can eventually forward corresponding multicast request messages to the CoAP sever.

In phase 2, the CoAP client looks up and retrieves membership information from the CoAP RD. In phase 3, the CoAP client generates a CoAP multicast request message according to the membership information obtained in phase 2, and sends this multicast request message to a group of CoAP servers, including the CoAP server. In return, each CoAP server may respond back to the CoAP client with a unicast CoAP message, not shown in FIG. 4.

Figure 5:
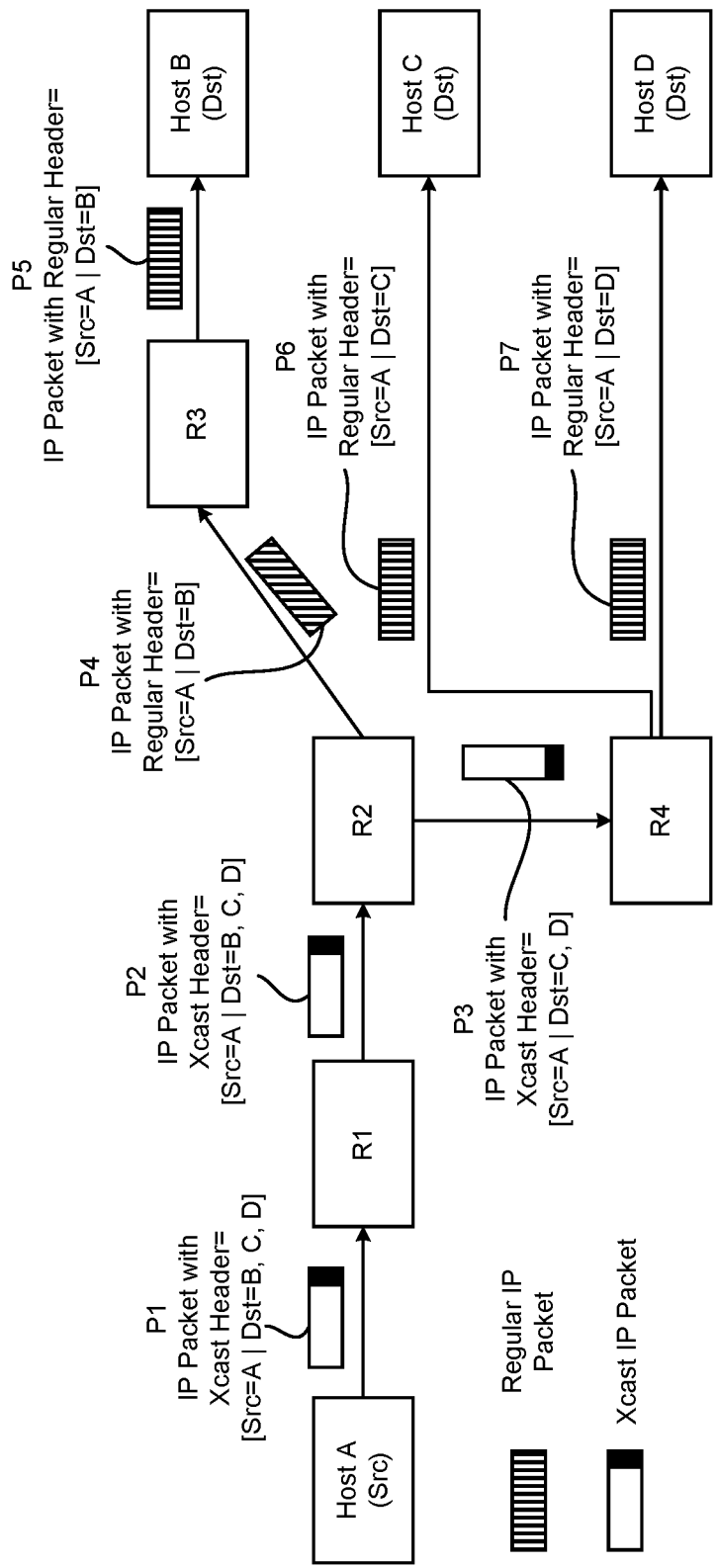
FIG. 5 is a schematic view of packets traveling in an example system using explicit multicast (Xcast.)

FIG. 5 illustrates an example where Host A acts as a source node that multicasts packets to three destination nodes, Host B, Host C and Host D, via routers R1-R4. Host A sends packet P1. Packet P1 is an IETF RFC 5058 Explicit Multicast (Xcast) packet. In Explicit Multicast, there is no membership management as used in traditional IP multicast. Instead, the source node creates Xcast packets by including the addresses of all destinations as a special header, i.e., an Xcast header that is included in each IP packet to be sent. Each router along the path will parse the Xcast header, partition the destinations based on each destination's next hop, generate a new Xcast header, and forward a packet with an appropriate new Xcast header to each of the next hops. When there is only one destination left, the Xcast packet may be converted into a regular unicast IP packet by the router, and the regular packet may be unicast along the remainder of the route towards the destination.

Here in FIG. 5, router R1 processes packet P1 and sends another Xcast packet P2 accordingly. Router R1 does not partition the destinations since the next hop of all three destinations is the same, router R2. Router R2 partitions the destinations in Xcast packet P2 and generates two packets. The first packet is an Xcast packet P3 sent to router R4, e.g., with an Xcast header of "[Src=A|Dst C, D]". The second packet is a regular IP packet P4 send to router R3 with host B as the destination.

Xcast may be more appropriate for scenarios with a small number of destinations, since it removes IP-Layer signaling overhead, such as from membership configuration and management, that is found in traditional IP multicast. However when a group has many destinations, Xcast headers may introduce high message overhead due to the size of the list of destinations. Similarly, when destinations are connected to many different routers, Xcast may introduce higher processing overhead in routers due to the partitioning of destinations and generation of new regular IP packets.

Multicast management may be facilitated by the use of a Bloom filter, such as is described in A. Broder and M. Mitzenmacher's article, "Network Applications of Bloom Filter: A Survey", in Internet Mathematics, vol. 1, no. 4, 2003, pp. 485-509. The term "Bloom filter," as used herein, may refer to a compact digital representation of a set of elements, or to the technique for generating that compact digital representation. A Bloom filter is a space-efficient mechanism, in the sense that the number of bits required to represent the set of elements in Bloom filter is much lower than the number of bits required to enumerate all of the elements of the set. A Bloom filter of a set has two properties that are significant for present purposes. First, a Bloom filter informs a recipient, without any error, when a given element does not belong to the set. Second, the Bloom filter informs a recipient, within a certain confidence, that a given element belongs to the set, with a possible false positive error. The more bits a Bloom filter uses, the smaller the false positive error it introduces.

Figure 6:
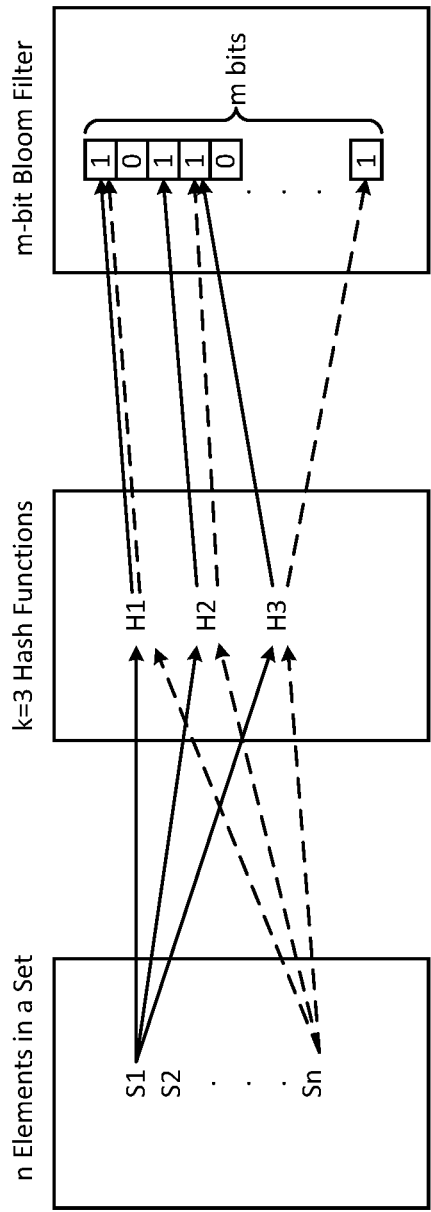
FIG. 6 illustrates the creation and use of an example Bloom filter.
Figure 6:
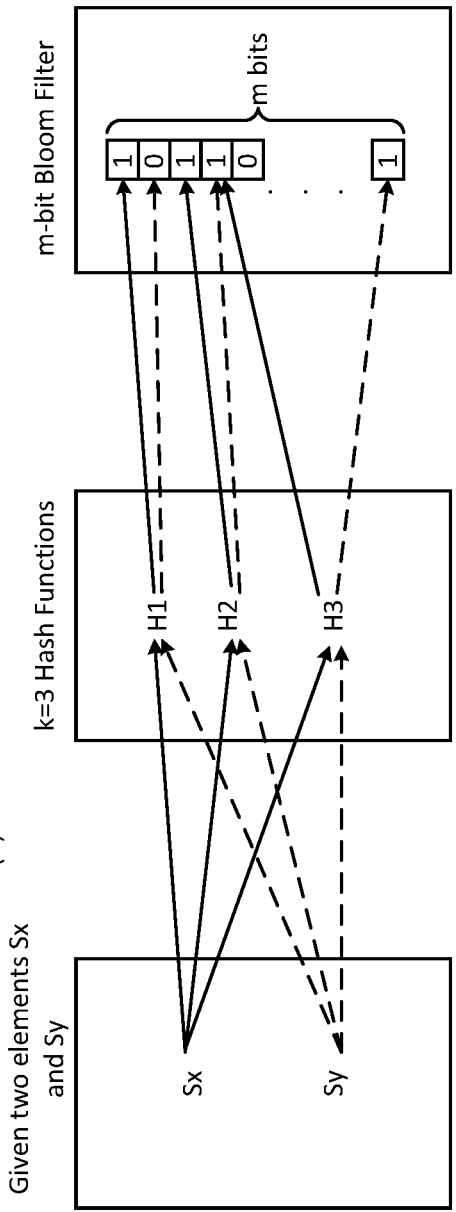

FIG. 6 shows the generation and use of a Bloom filter. In example (a) at the top of FIG. 6, a Bloom filter consisting of m bits is generated for a set of n elements via k hash filters. The Bloom filter bits are initially set to 0. Each element is then hashed k times, each time with a different hash function. In this example, there are three hash functions. The output of each hash operation is an integer between 1 and m, which indicates a bit location to be set to 1 in the Bloom filter. For example, if the output of a hash operation is 3, the 3rd bit of the Bloom filter will be set to 1. For each element, k out of m bits will be set to 1. For example, three hash functions operating on element S1 generate three integer values, e.g., 1, 3, and 4. Accordingly, the 1st, 3rd, and 4th bits of the Bloom filter are set to 1. Once set to 1, the bit remains set to 1. For example, if the hash results for element Sn are then 1, 3, and m, the $1^{st}$, $3^{rd}$ and $4^{th}$ bit remain 1, and the $m^{th}$ bit is set to 1.

Example (b) at the bottom of FIG. 6 shows how to determine whether a given element belongs to the set represented by the Bloom filter. Candidate Sx, is hashed three times using the same hash functions which generated the Bloom filter. The hash operation outputs are 1, 3, and 4. These hash results are then compared with the Bloom filter. In this example, since the $1^{st}$, $3^{rd}$, and $4^{th}$ bits of the Bloom filter are 1, there is a high probability that Sx belongs to the set. For candidate Sy, the hash operation outputs are 2, 4, and m. Sy definitely does not belong to the set since the $2^{nd}$ bit of the Bloom filter is zero. A given element does not belong to the set if any of its hash outputs correspond to a zero-valued bit in the Bloom filter.

Figure 7:
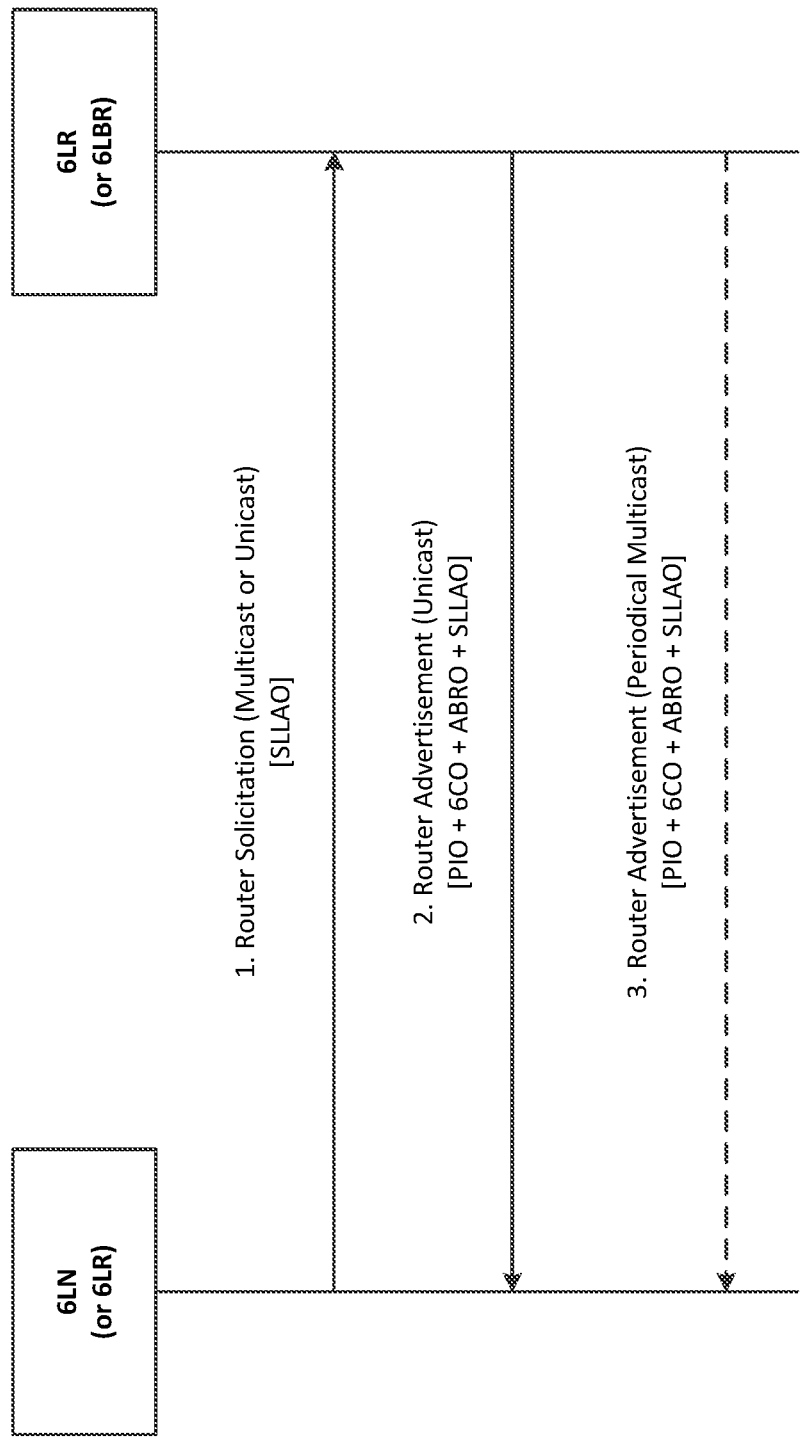
FIG. 7 is a call flow diagram showing an example of router discovery in 6LoWPAN neighbor discovery protocol (NDP).

FIG. 7 illustrates an example call flow for router discovery using router solicitation (RS) and router advertisement (RA) messages, such as are defined in IETF RFC 6775 Neighbor Discovery Protocol (NDP) in a Low-Power Wireless Personal Area Network (6LoWPAN). NDP includes optimized router discovery and address registration. After neighbor discovery is complete, routing protocols such as Routing Protocol for Low-Power and Lossy Networks (RPL) may be used for data transmission. 6LoWPAN NDP deals with packet adaptation, header compression, and neighbor discovery, while routing protocols are responsible for routing an IPv6 packet to and from a constrained device. A 6LoWPAN network normally implements both a 6LoW-PAN NDP and a routing protocol such as RPL.

Here in the example of FIG. 7, the RS and RA messages are Internet Control Message Protocol (ICMP) messages with ICMP Type set to 10 and 9 respectively. Using these messages, a 6LoWPAN node (6LN) may discover and/or connect with its first-hop 6LoWPAN Router (6LR). First, the 6LN sends RS message 1. RS message 1 may be multicast to neighboring routers. If the 6LN already knows the address of its 6LR, it may instead unicast message 1 to the 6LR. RS message 1 carries the 6LN's link layer address in a Source Link Layer Address Option (SLLAO). The 6LR receives RS message 1 and responds with a unicast RA message 2 to the 6LN. RA message 2 may contain several options such as: Prefix Information Option (PIO) for IPv6 address prefix information; 6LoWPAN Context Option (6CO) for IPv6 header compression context information; SLLAO for 6LR's link layer address; and Authoritative Border Router Option (ABRO) for the 6LoWPAN Border Router's (6LBR's) IPv6 address. Optionally, the 6LR may periodically broadcast RA messages 3.

Via the router discovery process, a 6LN may discover a number of 6LRs as its first-hop router candidates. The 6LN knows the IPv6 address prefix, which will be used to automatically formulate its own unique IPv6 address within the 6LoWPAN. The 6LN may choose a 6LR as its first-hop default router based on information obtained in a discovery process such as the method depicted in FIG. 7. Similar methods may be used by a 6LR to find a 6LBR and other 6LRs to establish multi-hop 6LoWPAN.

Figure 8:
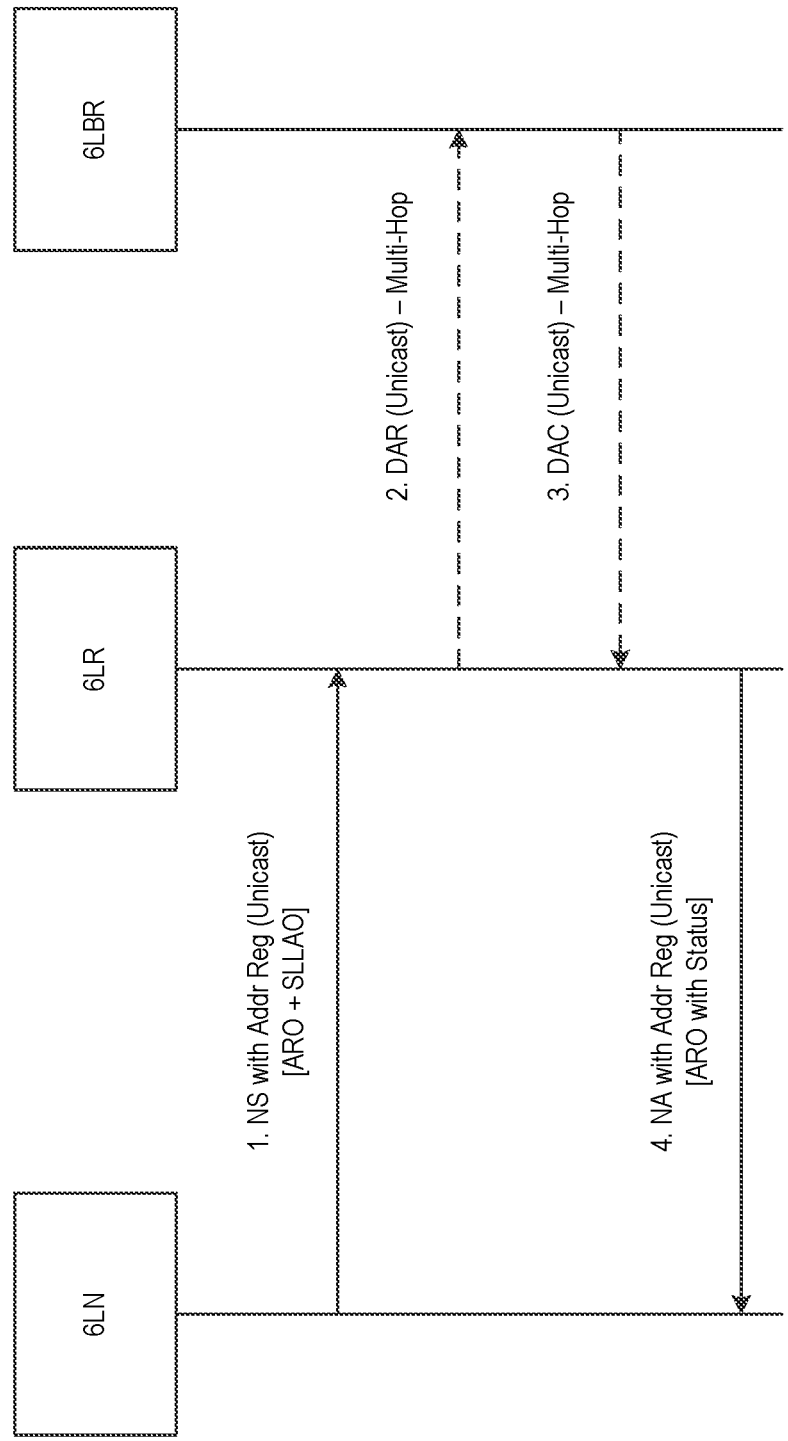
FIG. 8 is a call flow diagram showing an example address registration method in 6LoWPAN NDP.

FIG. 8 shows an example call flow for an address registration method. After router discovery, a 6LN may register its IPv6 address for certain amount of time, e.g., a registration time, which removes the need for periodic RS/RA message exchange between the 6LN and its 6LR. This feature facilitates, for example, sleep modes of 6LoWPAN nodes. As shown in the example of FIG. 8, during address registration, a 6LR may need to perform Duplicate Address Detection (DAD) with the 6LBR via Duplicate Address Request (DAR) and Duplicate Address Confirmation (DAC) message to guarantee that each 6LN within the 6LoWPAN has a unique IPv6 address. First the 6LN sends a Neighbor Solicitation (NS) message 1 to its first-hop default router, the 6LR, which was discovered during a router discovery process. NS message 1 may contain the Address Registration Option (ARO), which carries a registration time and an IEEE Extended Unique Identifier (EUI-64) of the 6LN. Per the IEEE, the EUI-64 is a 64-bit identifier that may be used in one of three ways. The EUI-64 may be used to address hardware interfaces within IEEE 802 or similar networking applications. The EUI-64 may be used as an identifier of a specific hardware instance that is not necessarily a network address. Further, the EUI-64 may be used to identify a design instance, such as a model number, as opposed to a hardware instance.

After receiving NS message 1, the 6LR sends DAR message 2 to the 6LBR. This may be a unicast message. Also, the 6LBR could be multiple hops away from the 6LR. DAR message 2 contains the IPv6 address of 6LN, the registration time, and the EUI-64 address as carried in the ARO. Note that a DAR message with registration time set to zero means address de-registration.

The 6LBR maintains a centralized database of IPv6 addresses of all registered 6LNs. It checks the address of the 6LN against the database to check whether the address provided is a new address or a duplicate one. The 6LBR then sends a DAC message 3 back to the 6LR. This message may be unicast and traverse multiple hops to reach the 6BLR. The DAC message 3 may include a registration status, such as Success, Duplicate Address, or Neighbor Cache Full, for example.

The 6LR then sends a Neighbor Advertisement (NA) message 4 to the 6LN to inform its registration status from DAC message. The 6LR may then create a "registered" Neighbor Cache Entry (NCE) for the 6LN, or change a previously created "tentative" NCE during router discovery process to a "registered" NCE.

Figure 9:
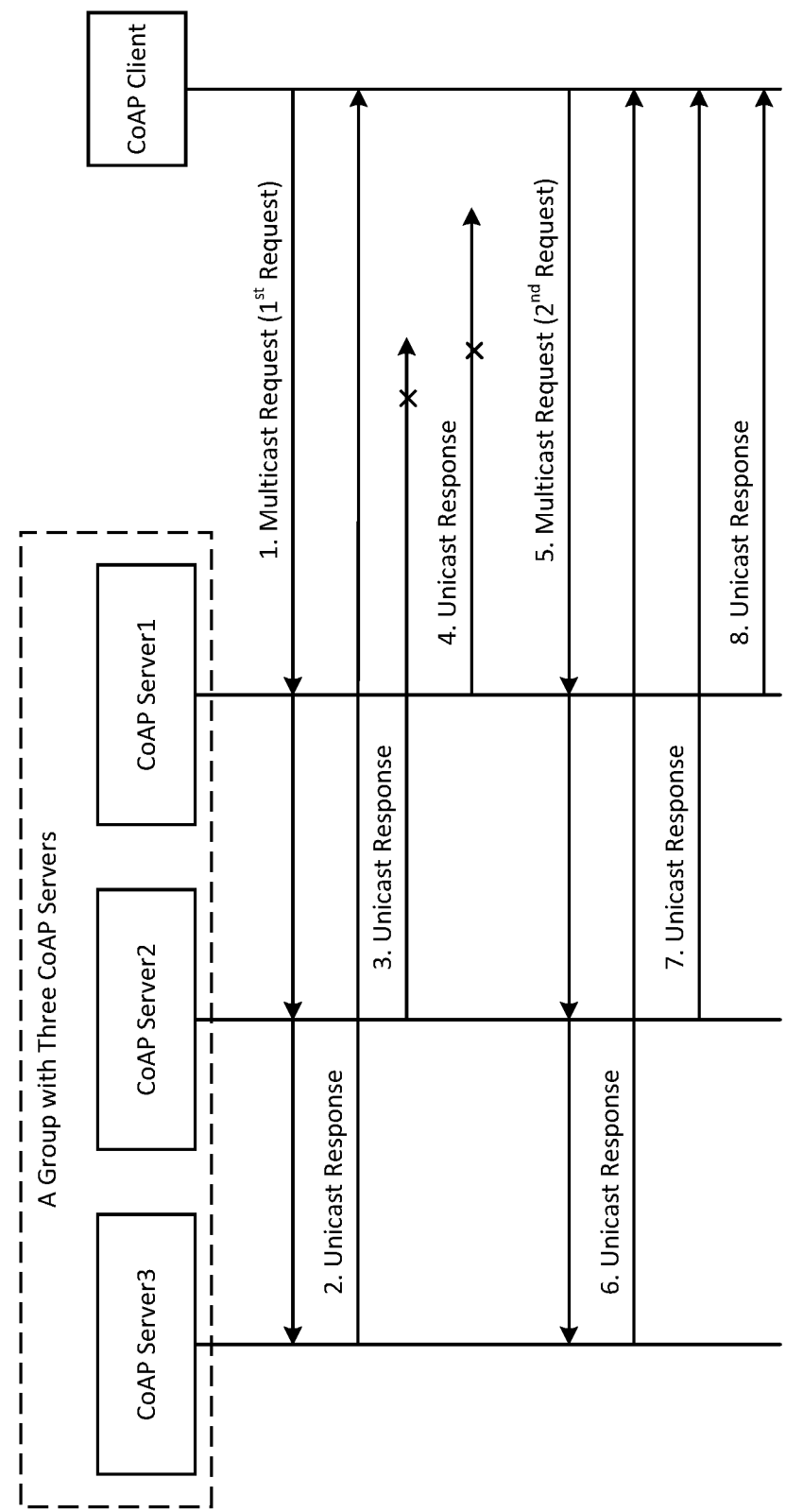
FIG. 9 is a call flow diagram showing an example of CoAP group communications in an unreliable environment.

FIG. 9 shows an example call flow of CoAP group communications where communications may be unreliable. A CoAP client sends a first standard multicast CON request 1. Request 1 is received by three CoAP servers. The client successfully receives a CoAP NON response 2 from CoAP server 3. CoAP servers 1 and 2 also send CoAP NON responses to the CoAP client, which are responses 3 and 4 respectively. However responses 3 and 4 do not reach the CoAP client, e.g., due to communication link quality or other reasons.

The CoAP client then sends a second standard multicast request, message 5. Standard multicast requests do not contain any indication of which servers should reply, and therefore all three CoAP servers again send a CoAP NON response, which are responses 6, 7, and 8. Although CoAP servers may decide to ignore the received requests without sending a response, there is no description in RFC 6690 about the conditions under which CoAP servers should ignore the request. The example of FIG. 9 assumes the CoAP servers send a response for each received request.

This time the CoAP client successfully receives all three responses. Notably the CoAP client has now received two responses, responses 2 and 6, from CoAP server 3. These responses are redundant. Response 6 is a waste of transmission energy for each node it traverses, as well as a waste of processing overhead.

Figure 10:
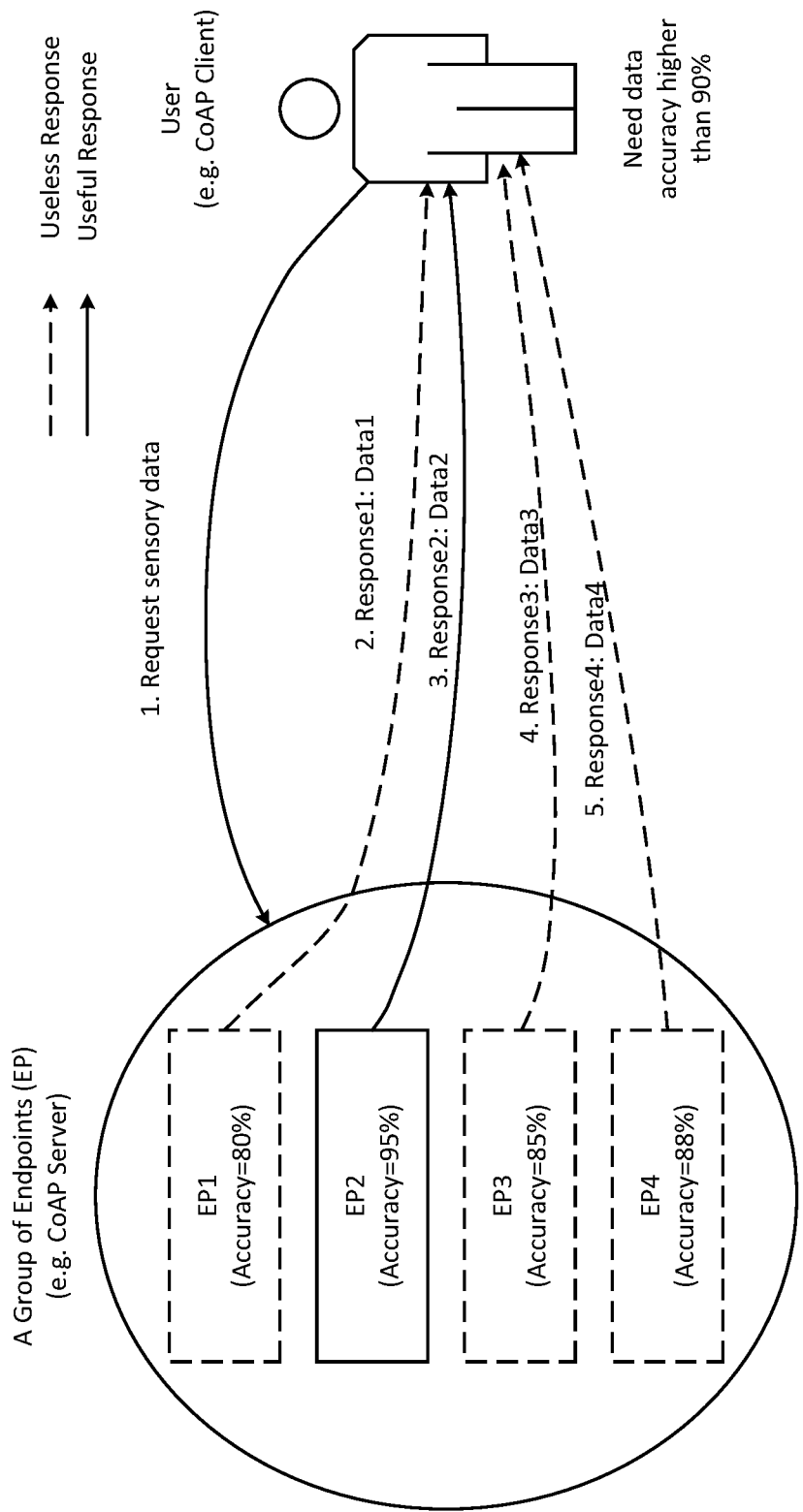
FIG. 10 is a data flow diagram illustrating communications for an example of data retrieval for a user with a particular accuracy requirement.

FIG. 10 illustrates a scenario where a user with a particular data requirement sends a request to multiple endpoints. The user, e.g., a CoAP client, sends a sensory data multicast request 1. Request 1 is received by four endpoints, EP1-EP4. The endpoints may be, for example, sensor nodes which are CoAP servers. According to standard multicast protocols, each sensor node EP1-EP4 sends back a unicast response, which are responses 2-5 respectively. In this example, each sensor node EP1-EP4 has a different accuracy rating, e.g., due to issues of the calibration, device oscillation, etc.

The user receives responses from all four sensor nodes EP1-EP4. However, the user requires that the data accuracy has to be over 90%. Only the data from EP2 meets this requirement. Responses from the other three sensor nodes are not useful.

The example of FIG. 10 illustrates how in many situations, under standard protocols, many unnecessary responses to multicast requests may be sent by CoAP servers. In standard CoAP group communication protocols, a request message from a CoAP client will be sent to all of the CoAP servers in a given group. Normally, as a result, all of the CoAP servers will send back a response. They respond regardless of whether the response meets the CoAP client's requirement, and regardless of whether the response is redundant with a previous response. In other words, under standard protocols, a CoAP client cannot explicitly or implicitly indicate or otherwise select which CoAP servers should send a response. One solution to address this is a CoAP multicast request that includes additional information to implicitly or explicitly indicate which CoAP servers should respond. Similarly, RD-assisted context-aware group management may also be employed to avoid unnecessary responses. Such approaches allow a CoAP client to, in effect, select which CoAP servers will respond to its multicast request. By the same token, these approaches allow CoAP servers to respond selectively to such requests they receive.

A CoAP client may use explicit server indication, whereby the CoAP client attaches a service indication field, e.g., serverindicator, in its multicast requests. The information in the serverindicator may explicitly indicate which servers should or should not send a response. The serverindicator may be in the form of a list of IP addresses or identifiers of members within the group. The serverindicator may also be a Bloom filter of a set of CoAP servers. On receiving a request including a serverindicator, each CoAP server may independently determine whether it needs to send a response, or not, based on the received serverindicator information.

A CoAP client may also use implicit server indication whereby a CoAP client attaches a context indication field, e.g., contextIndicator, containing client requirements, such as a sensor data accuracy requirement, in its multicast request message. The information contained in the contextIndicator may represent one or more requirements or expectations of the CoAP client. When a CoAP server receives the request message, it may compare its local context information to the requirements in the contained contextIndicator. If the requirements from the CoAP client are satisfied, the CoAP server may then send a response. If the requirements are not met, the CoAP server may opt to not send a response.

RD-assisted context-aware group management may be employed whereby a CoAP client discovers appropriate CoAP servers which are, or should be, members of a group, based on given context requirements. Similarly, an RD may create groups based on awareness of the context requirements of one or more CoAP clients.

Explicit and implicit server indication, as well as RD-assisted context-aware group management, may be achieved via extensions to existing CoAP, RD, and 6LoWPAN protocols. Table 1 lists compares example extensions to a few existing multicast solutions.

TABLE 1

Comparison of IP Multicast, Xcast, CoAP Multicast, and Proposed Schemes

| Scheme | Need IP Layer Signaling | Extra Info in Multicast Request message | Need Router to Parse and Generate New Multicast Request Message | Changes to CoAP Group Mgmt. | Causes Redundant Responses | Context-Awareness |
|---|---|---|---|---|---|---|
| IP Multicast | Yes | No | No | N/A | Yes | No |
| Xcast | No | IP Address of Each Receiver - Large Message Size | Yes - High Overhead | N/A | Yes for special requirement cases. No in unreliable environment cases. | No |
| CoAP Multicast | Yes | No | No | No | Yes | No |
| Extensions for Explicit Server Indication | Yes | serverIndicator (e.g. Bloom filter) - Small Message Size | No | No | No | No |
| Extensions for Implicit Server Indication | Yes | contextIndicator (e.g. accuracy) - Small Message Size | No | No | No | Yes |
| Extensions for RD-Assisted Context-Aware Group Mgmt. | Yes | No | No | Yes | No | Yes |

Figure 11:
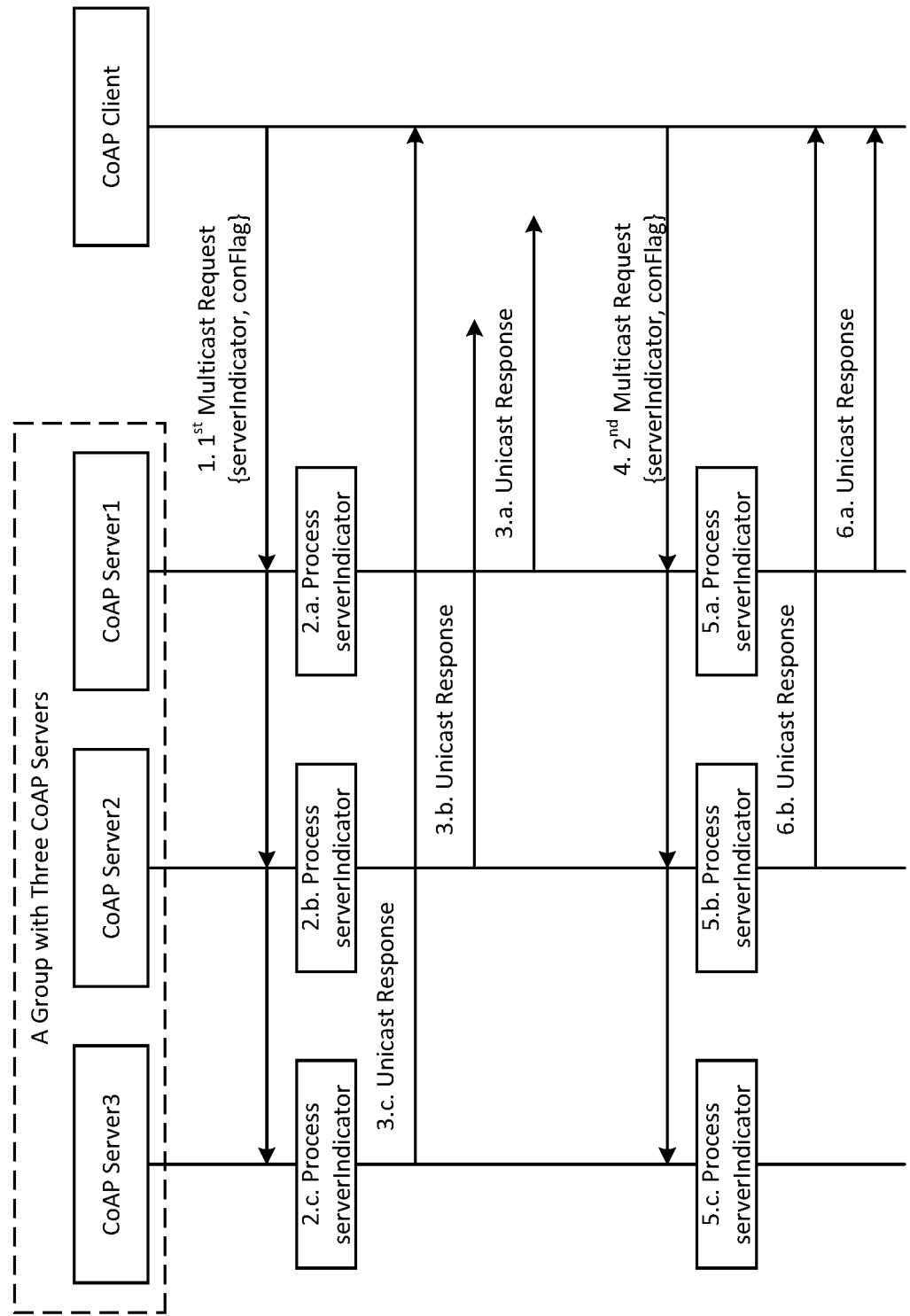
FIG. 11 is a call flow diagram showing an example of CoAP group communications with explicit server indication.

FIG. 11 is a call flow diagram of an example method for CoAP group communications with explicit server indication. A CoAP client sends a first multicast request message 1 to a group of three CoAP servers. Although FIG. 11 shows only three CoAP servers, 1-3, the method may be applied to scenarios with any number of CoAP servers. Message 1 includes a serverindicator field and a conFlag field in addition to standard CoAP message fields. The serverindicator field may consist of such parameters as: serverFlag serverSet, addrType, and serverResProb.

The serverFlag parameter may indicate that all CoAP servers in the serverSet are expected to send a response, e.g. if serverFlag=TRUE. Similarly, serverFlag may indicate that all CoAP servers in the serverSet are expected to not send a response, e.g. if serverFlag=FALSE. In practice, one bit can be used to represent serverFlag The parameter serverSet may include, for example, a list of IP addresses of CoAP servers, a list of server group member identifiers, a Bloom filter of a set of servers, or a combination thereof. The addrType parameter may indicate which elements included in a serverSet are IP addresses, e.g., with addrType=1, which elements are group member identifiers, e.g., with addrType=2, and which are Bloom filters, e.g., with addrType=3.

As discussed above in reference to FIG. 6, a Bloom filter of a set of servers may be generated by a CoAP client using hash functions. The list of hash functions and other group management information may be provided to each CoAP server during group membership configuration, as discussed below in reference to FIG. 13.

A list of server group member identifiers may take the form of, for example, a list of real identifiers assigned by an RD for each member. Alternatively, a list of member identifiers could take the form of an M-bit member mask where, e.g., for a group M member, each bit j (1=<j<=M) could be 0, indicating that the member with the identifier equal to J is not included in this mask, or 1, indicating that the member with the identifier equal to J is included in this mask.

The serverResProb parameter may indicate the probability that a CoAP server should respond. A CoAP server may perform a Bernoulli trial with probability serverResProb. If successful, the server will respond to the CoAP client. If unsuccessful, the CoAP server will ignore the multicast request. Notably, in some implementations, the serverindicator field may only contain the serverResProb parameter.

A multicast request message may also include a conFlag parameter. This parameter may indicate whether each CoAP server should send a CON response, e.g. if conFlag=1, or a NON response, e.g. if conFlag=0. For the example shown in FIG. 11, conFlag=0 and each response from CoAP servers should be a CoAP NON message.

Referring again to FIG. 11, in steps 2a, 2b, and 2c respectively, each of the CoAP servers 1-3 receives message 1 and analyzes it, e.g., by examining the parameters of the serverindicator field, to decide whether a unicast response is required from the server. For example, if serverFlag=1, all CoAP servers contained in serverSet should send a unicast response. If serverFlag=0, all CoAP servers contained in serverSet should not send a unicast response. As required, each server also determines the type of response, e.g., whether response should be a CoAP CON message (e.g. conFlag=1) or a CoAP NON message (e.g. conFlag=0) based on conFlag parameter contained in the multicast request message. In this case, each of the CoAP Servers 1-3 responds to message 1 with its own unicast message to the CoAP client, in messages 3a, 3b, and 3c respectively.

In the example of FIG. 11, the CoAP client sends a second multicast request, message 4, which contains a new serverindicator indicating that CoAP Server3 should not send a response. This may be achieved, for example, by setting serverSet=[CoAP Server1, CoAP Server2] and serverFlag=TRUE. Alternatively, this may also be achieved by setting serverSet=[CoAP Server3], serverFlag=FALSE, and also setting conFlag=0. Either serverindicator informs CoAP server 3 that it does not need to send back a response. Only CoAP server1 and CoAP server2 need to send responses back. In steps 5a, 5b, and 5c, respectively, CoAP servers 1-3 process message 4, in a manner similar to that of steps 2a, 2b, and 2c. Accordingly, CoAP server1 and CoAP server2 respond to the CoAP client with unicast responses messages 6a and 6b, respectively.

Figure 12:
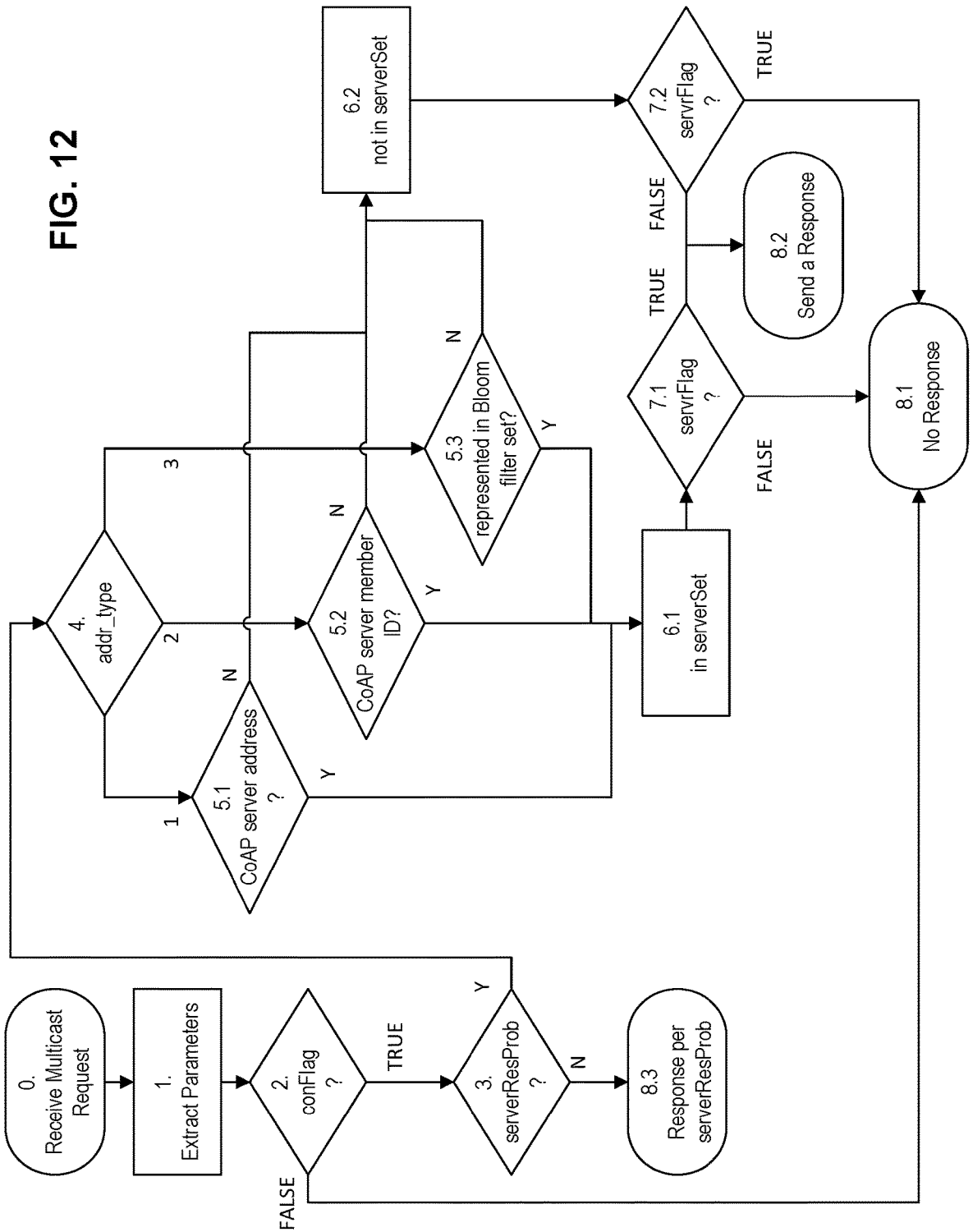
FIG. 12 is a flow chart of an example method for processing server indication parameters at a CoAP Server.

FIG. 12 is a flow chart depicting an example method whereby a CoAP server may process a CoAP multicast request containing an explicit server indication. In step 0, the server receives the request. In step 1, the server extracts the relevant parameters. In step 2, the server checks the parameter conFlag. If conFlag=false, no response it required. Otherwise in step 3, the server checks the parameter serverResProb.

In step 4, the server checks the address type, and then in steps 5.1, 5.2, or 5.3, depending on the address type, the server checks the address of each server in the server set accordingly. For example, if the address type is a Bloom filter, then in step 5.3 the server checks whether the bits corresponding to the hash results for the server address are set to 1 in the Bloom filter. If the server belongs to the server set, the method proceeds through the affirmative result path 6.1. If the server does not belong to the server set, then the method proceeds via the negative result path 6.2.

The interpretation of the server flag parameter depends upon the path taken. If the server belongs to the server set, the server flag parameter is tested in step 7.1. If the servFlag=true, then a response is sent in step 8.2. Otherwise the process terminates with no response sent in step 8.1.

Conversely, if the server is determined not to be in the server set, then the server flag parameter is tested in step 7.2. If the parameter servFlag=false, then a response is sent in step 8.2. Otherwise the process terminates with no response sent in step 8.1.

Figure 13:
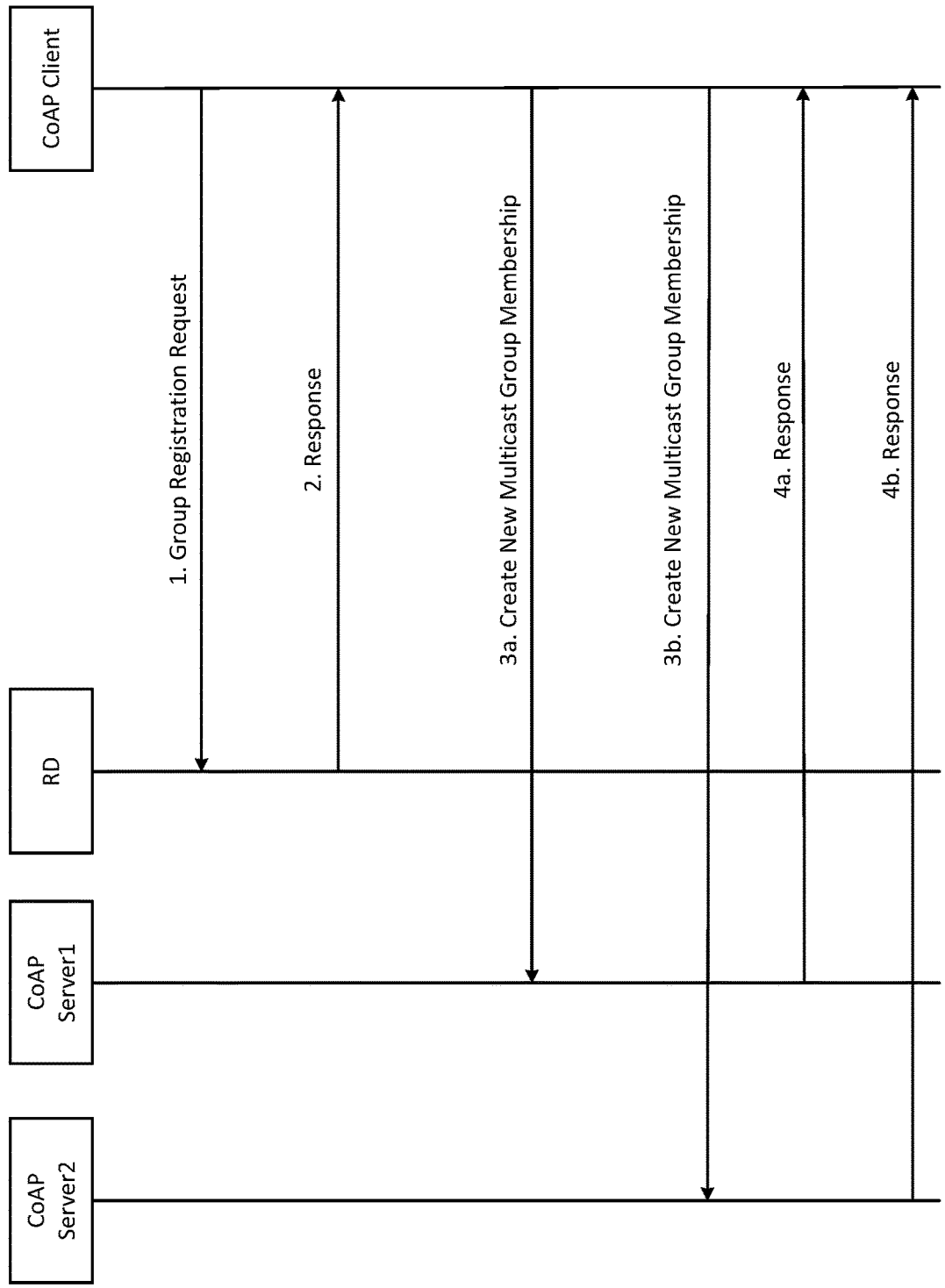
FIG. 13 is a call flow diagram showing an example of group membership configuration using a resource directory.

FIG. 13 is a call flow diagram of an example method for generating and configuring a member identifier (MID) for each member of a multicast group. A CoAP client sends a group registration request message 1 to an RD. Message may specify which servers are to be included as members of the group. To create a group with two members, CoAP server1 and CoAP server2, for example, the message may contain the following, for example:

POST coap://rd.example.com/rd-group?gp=temps Payload: < >;ep="server1", < >;ep="server2".

In response, the RD creates the requested group, and may assign and maintain a unique MID for each member, e.g. MID=121 for CoAP server1, and MID=122 for CoAP server2. The MID for each group member is unique within each group. The RD then sends a response message 2 to the CoAP client. Message 2 may contain each assigned MID plus an associated server identifier and/or the list of hash functions, e.g., a hashFuncList field, for generating a Bloom filter. Note that whenever the CoAP client receives a multicast request message containing a Bloom filter in serverindicator, e.g., with addrType=3, it will use these hash functions to determine whether it is included in the group of servers represented by the Bloom filter using methods such as those described above in reference to FIG. 6. Message 2 may contain the following, for example:

Created Location: /rd-group/12; MID=(server1, 121), MID=(server2,122); hashFuncList.

From message 2, the CoAP client knows the MID assigned to each CoAP server and the list of hash functions for generating a Bloom filter. The CoAP client contacts each CoAP server to establish membership in the multicast group by providing to each member server, via messages 3a and 3b, the IP multicast address or the FQDN name of the group. Messages 3a may contain, for example:

POST coap://server1.example.com/coap-group Payload: ("n": "alltemps.kitchen.example.com", "a": "[ff15::4200:f7fe:ed37:abcd]:4567", "MID":"121", "hashFuncList":"Func1/Func2/Func3")

Messages 3b may contain, for example:
  POST coap://server1.example.com/coap-group Payload: ("n": "alltemps.kitchen.example.com", "a": "[ff15:: 4200:f7fe:ed37:abcd]:4567", "MID":"122", "hashFuncList":"Func1/Func2/Func3")

CoAP servers 1 and 2 receive the messages 3a and 3b, respectively. Each server then stores its respective assigned MID in its local database, and then sends a response back to CoAP client, messages 4a and 4b. The messages 4a an 4b may contain, for example:
  Created Location: /coap-group/12

Note that a CoAP server may be assigned multiple MIDs if it is a member of multiple groups. The MID assigned to the server for each group may be different.

In addition, as an alternative to messages 3a, 3b, 4a, and 4b of FIG. 13, the RD may use a similar method to create new multicast group membership at each CoAP server. For example, the RD may configure the assigned MID and hash functions for each CoAP server in addition to the IP multicast address or the FQDN name of the group. In this way, the CoAP client would not need to contact each CoAP server to establish group membership.

CoAP group communications may also be established using an implicit server indication, whereby a CoAP client provides a context indication, such as a contextIndicator field, in a multicast request message. A context indication may be any form of context information provided by the client that a CoAP server may compare to its local context information to determine whether the server is required to send a response to a multicast request. The contextIndicator field informs each server of what CoAP client expects or requires from a responding server.

Figure 14:
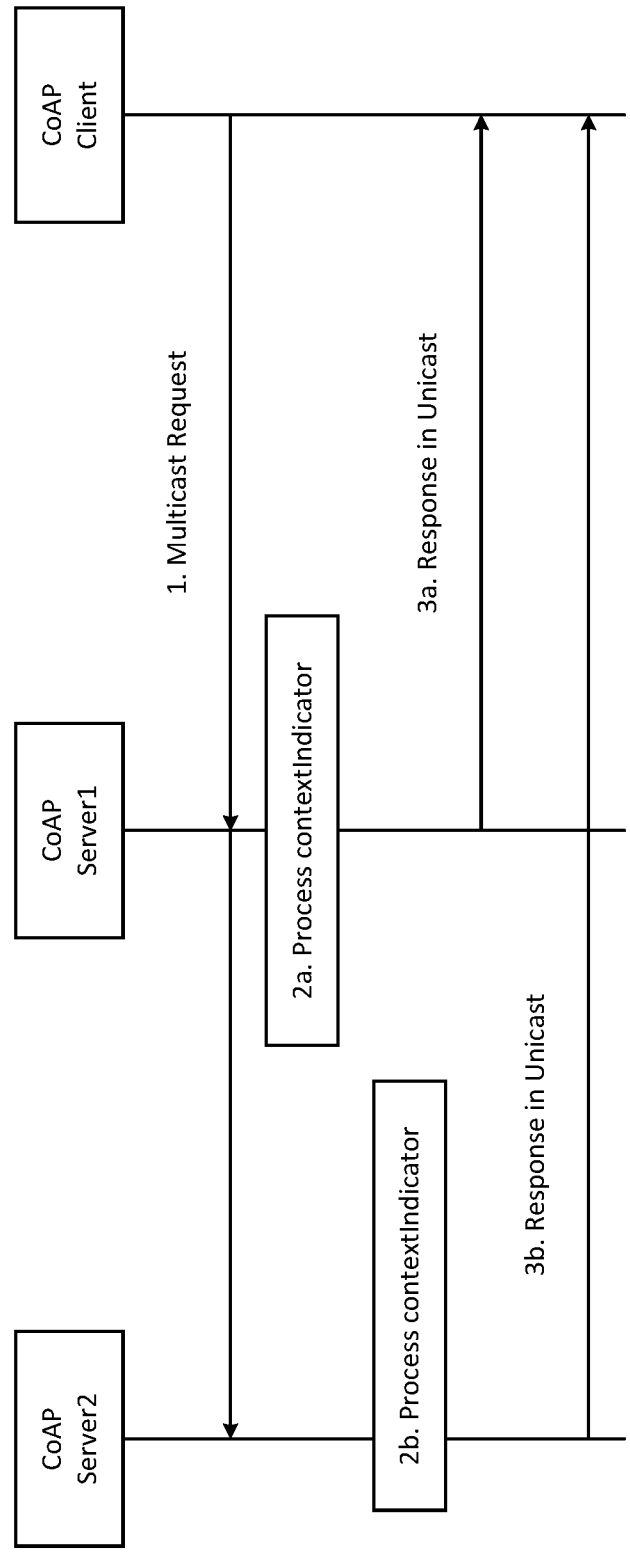
FIG. 14 is a call flow diagram showing an example of a multicast request using implicit server indication.

FIG. 14 is a call flow diagram of an example method using an implicit server indication in a multicast request. Although only two CoAP servers are shown in this example, the method may be applied to other scenarios with any number of CoAP servers. A CoAP client sends a multicast request message 1 to an IP multicast address. The message is received by CoAP server1 and CoAP server2. This message contains a context indication field, contextIndicator, in addition to standard CoAP message fields.

The contextIndicator field may include a number of parameters, such as contextType and contextValue. The contextType parameter may describe the type of context, e.g., contextType=1 for sensor data accuracy, contextType=2 for geolocation, contextType=3 for time of resource creation, or contextType=4 for when the resource was last updated. The contextValue parameter may contain a value per the contextType. For example, if contextType=1, contextValue may be a fraction between 0 and 1, e.g. 0.9, to represent 90% expected sensory data accuracy. The contextIndicator field may further include an operator parameter, for example, which may indicate which operation a CoAP server should perform to compare contextValue against its local context information. For example, for contextType=1 signifying accuracy of sensor data, the operator may be ">=", i.e., not smaller than, or "<", i.e., smaller than.

The contextIndicator field may include responseFlag parameter. For example, if responseFlag=1 or true, each CoAP server needs to send a response when the output of comparing its local context information against "contextValue" using "operator" is true, and not send a response when the output is false. If responseFlag=0 or false, the CoAP server need not send a response when the output of comparing its local context information against contextValue using the specified operator is true, but the server needs to send a response when the output is false. A responseFlag field is optional. When a responseFlag is not included, the CoAP server may process contextIndicator in the same way as when responseFlag=true.

In steps 2a and 2b, CoAP servers 1 and 2 receive multicast request message 1 and process the contained contextIndicator. Each server determines whether it has to send a response by comparing its local context information to the context information contained in the contextIndicator. Using sensory data accuracy, e.g. contextType=1, as an example, a CoAP server may send a response only if its sensory data accuracy is greater than or equal to the accuracy contained in contextValue.

Accordingly, CoAP servers 1 and 2 send unicast response messages 3a and 3b respectively. In addition to regular data, the response message may optionally contain a contextIndicator to indicate the actual local context information in a CoAP server that is associated with this response. This contextIndicator may include, for example, a contextType and a contextValue.

CoAP group communications may also be established using RD-assisted context-aware group management. In this approach, CoAP client does not need to attach either a serverindicator or contextIndicator in the multicast request message. Instead, the client may use context information to discover appropriate CoAP servers from the RD, or the RD may create a group with appropriate members according to the requirements of the client. Thereafter the CoAP client may simply use standard multicast request protocols to interact with CoAP servers within a group. If all the members in a specially-selected group meet a CoAP client's requirements, no unnecessary responses will occur.

An RD may take advantage of contextual information to form groups automatically or at the request of a CoAP. For example, an RD may take sensor data accuracy into account when forming groups. Similarly, by using geolocation as a criterion, an RD may create a group of resources where each member is within a particular geographic area. By using resource time of creation or time of last update as a criterion, the RD may create a group of resources where each member was created within a particular window of time. Other criteria may be used, and criteria may be combined.

Figure 15:
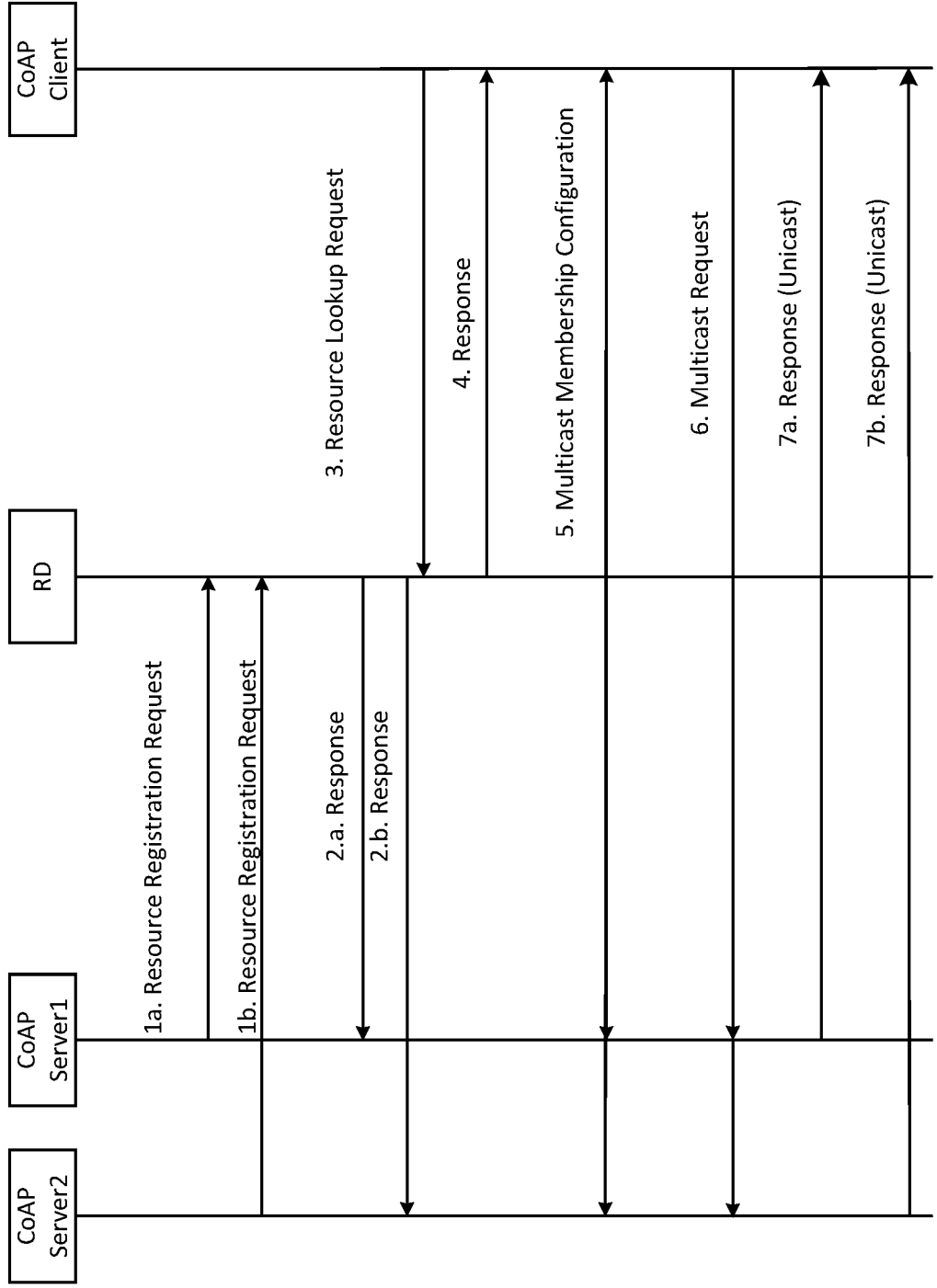
FIG. 15 is a call flow diagram showing an example of CoAP multicast communications using context-aware member discovery.

FIG. 15 is a call flow of an example method whereby an RD is used to discover appropriate CoAP servers based on context information. Although only two CoAP servers are shown in this example, the method may be applied to other scenarios with any number of CoAP servers. In this example, the CoAP servers 1 and 2 register their resources with the RD through messages 1a and 1b respectively. In addition to a resource URI, messages 1a and 1b contain context information, e.g., context types and context values, associated with this resource being registered. For example, message 1a may contain:
  POST coap://rd.example.com/rd?ep=node1,
  Payload: </temp1>;rt="temp";accuracy=91%
  Similarly, message 1b may contain:
  POST coap://rd.example.com/rd?ep=node1
  Payload: </temp1>;rt="temp";accuracy=91%

In response, the RD sends back to CoAP server1 and CoAP server2 response messages 2a and 2b respectively. Next, a CoAP client sends a resource lookup request 3 to the RD. This message may contains a context criteria such as "accuracy>90%," for example, to discover any CoAP server whose sensory data has accuracy above 90%. Message 3 may contain, for example:
  GET coap://rd.example.com/rd-lookup/res?rt=temp;accuracy>=90%

In response, the RD searches its records and sends response message 4 to the CoAP client. Response message 4 contains a list of records with context information meeting the requirements indicated in request message 3. For example, message 4 may contain:

<coap://(ip1:port1)/temp1>; rt="temp"; accuracy=91%,
<coap://(ip2:port2)/temp2>; rt="temp"; accuracy=92%

The RD may apply various policies in determining which resources to include in response message 4. For example, if all CoAP clients request higher accuracy sensor readings, CoAP servers with higher accuracy may need to join too many groups and get overloaded. To mitigate this issue, the RD may set a maximum limit on the number of groups to which a CoAP server belongs. For example, the RD may specify that a CoAP server may not belong to more than five groups simultaneously.

After receiving response message 4, the CoAP client may use standard multicast protocol messages 5 to configure membership in the multicast group. In the example of FIG. 15, both CoAP server 1 and CoAP server 2 are members of the new group. Once the group is established, the CoAP client may send a multicast request message 6, which is received by CoAP server1 and CoAP server2. Alternatively, this message may optionally contain explicit or implicit server indications, such as context parameters like context-Type. CoAP server1 and CoAP server2 send unicast response messages 7a and 7b, respectively, back to the CoAP client. Responses 7a and 7b may contain the context type or value information designated in message 6 or present in the server.

Figure 16:
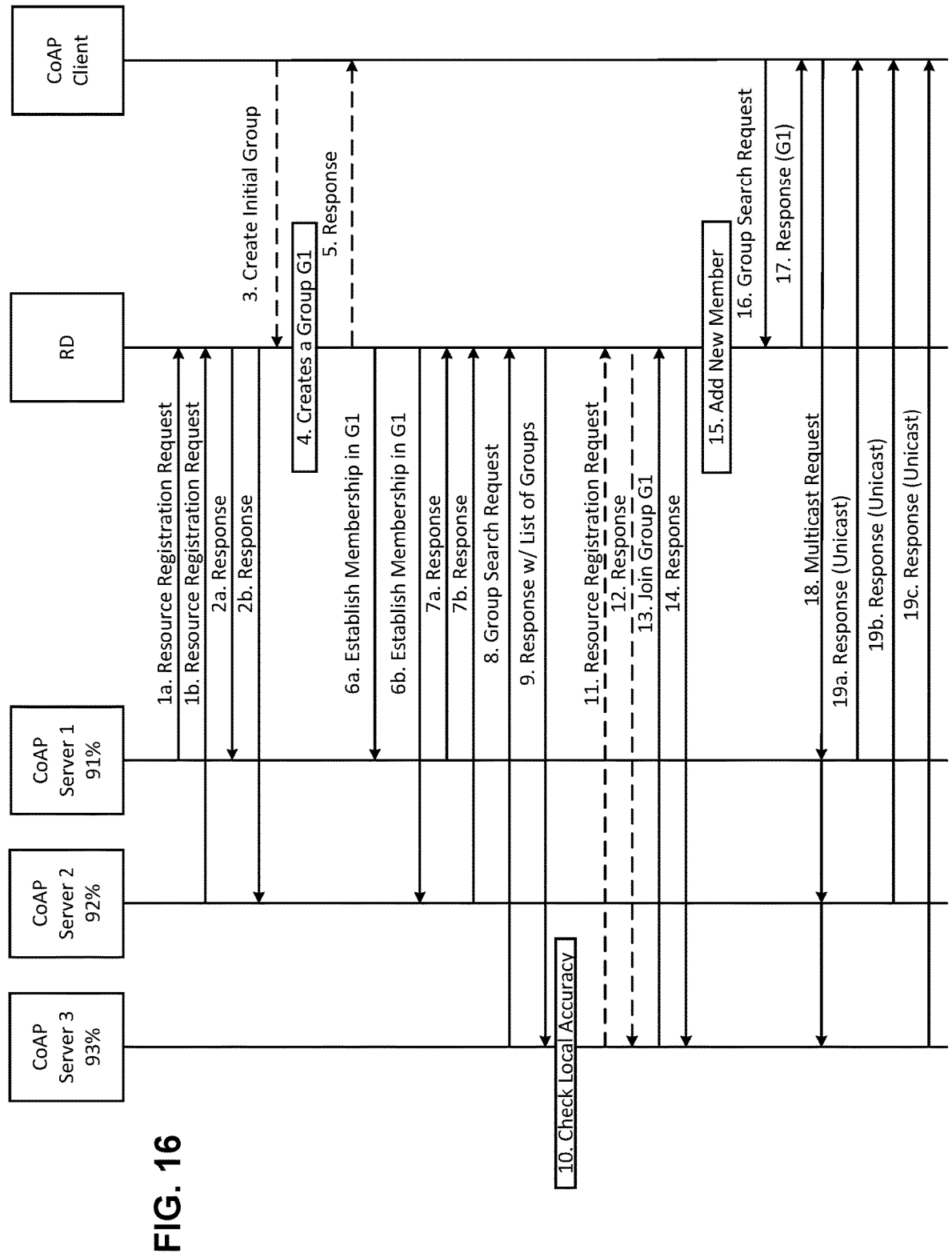
FIG. 16 is a call flow diagram showing an example of RD-assisted group management.

FIG. 16 is a call flow of an example method by which an RD may assist in creating a context-aware group with members meeting the requirements of a CoAP client. In this example, there are three CoAP servers, 1, 2, and 3. The accuracy associated with the resources of these servers is 91%, 92%, and 93%, respectively. Initially, only two of the three servers register their resources with the RD, via resource registration requests 1a and 1b. The RD acknowledges these registrations in responses 2a and 2b. Then the CoAP client sends a request for a group to the RD in message 3. Message 3 includes context information limiting the group size to three members and requiring that data accuracy be >90%. For example, message 3 may contain:

Create Initial Group (Accuracy=90%, groupSize=3)

In step 4, the RD searches its resource records and creates a group G1. Each member in G1 is selected to meet the context requirements indicated in message 3. Since both CoAP server1 and CoAP server2 have accuracy over 90%, the RD adds them to form a group with two members. If the maximum number of members has not been reached based on existing resource records, the RD may add more appropriate members at a later time.

Once group G1 is formed, the RD may then send a response message 5 to the CoAP, including such information as: the URI of group G1; the number of current members of G1; the identifier of each member in G1; and the multicast address or a FQDN corresponding to the group G1.

If the RD sends message 5, then both the RD and the CoAP client have the information necessary to configure the group membership of the servers. In the example of FIG. 16, it is the RD that sends messages 6a and 6b to CoAP server 1 and CoAP server 2 respectively. Messages 6a and 6b may include G1's URI at RD, corresponding multicast address, and associated context requirement, i.e., accuracy>90%. For example, messages 6a and 6b may contain:

Create New Multicast Group Membership (Multicast Address, Accuracy=90%)

CoAP server 1 and CoAP server 2 then respond to the RD in messages 7a and 7b. Note that Step 6a/6b and Step 7a/7b shows that CoAP client can additionally request/obtain instantaneous context information from CoAP servers. For example, the CoAP client may indicate the type of identifier of context information to be requested in Step 6a/6b. In turn, CoAP server 1 and CoAP server 2 may send back context values to the CoAP client in Steps 7a and 7b.

Next CoAP server 3 sends a CoAP GET message 8 to search for existing groups in the RD. The RD returns a list of groups in message 9 to CoAP server 3. Message 9 may contain the URI of each group resource and associated context requirement, e.g. accuracy>90% for G1. In step 10, CoAP server 3 checks its local accuracy and finds it meets accuracy requirement of G1. Accordingly, CoAP server 3 may send a resource registration message 11 to the RD, specifying an accuracy of 93%, to which the RD may respond in message 12. The RD may then update its records to include CoAP server 3 in group G1, and inform the CoAP client accordingly.

Alternatively, as shown in FIG. 16, in response to the decision in step 10 that CoAP server 3 meets the requirements of group G1, CoAP server 3 may send a CoAP PUT message 13 to RD to add itself as a new member of G1. It may also indicate its accuracy in this message. For example, message 13 may contain:

Join Group G1 (accuracy=93%)

The RD may send a response message 14 to acknowledge receipt of message 13. Then in step 15, the RD adds CoAP server 3 as a new member of G1. Now G1 has three members.

Next the CoAP client may send a group search request CoAP GET message 16 to the RD. Message 16 may include a context indication which the RD is able to accommodate. For example, message 16 may include a context requirement of an accuracy>90%, which is met by group G1, and the RD may then response with a message 17 with information regarding group G1. If on the other hand, the request cannot be accommodated with existing groups, the RD may repeat, e.g., step 4 and associated messages, to establish a new group. For example, if the context requirement of message 16 were >=92%, G1 would not be a valid response. However, the RD could form a new group G2 that includes CoAP servers 2 and 3. Further, if the RD has no resources which satisfy CoAP client's context requirement, the RD will inform the CoAP client that no group has been found.

In the example of FIG. 16, the context requirement of message 16 is for an accuracy>90%, and the RD responds in message 17 with information regarding G1. G1 at this point includes CoAP servers 1-3. The CoAP server sends a multicast request message 18 to G1, to which the CoAP servers 1-3 reply by sending unicast response messages 19a, 19b, and 19c respectively.

Note that messages 3 and 5 in FIG. 16 are optional. With or without the input of a CoAP client, e.g., in message 3, in step 4 the RD may proactively create groups with different accuracies according to certain criteria, such as, but not limited to, CoAP client search histories, group policies, registered resource accuracies, etc.

Further, group criteria may be altered over time. The context requirement associated with a group may be changed by the RD or by a CoAP client. In such a case, the RD may remove CoAP servers from membership in a group when the servers do not meet the new context requirement. Similarly an RD may add new CoAP servers which satisfy the new context requirement. Further, the size of a group may be altered. If a CoAP client requests a group with a size bigger than three, and the initial size of the group is only three, when a fourth CoAP server is later found to meet the context requirement of the CoAP client, the RD may add this fourth CoAP server to the group. Note that in the example of FIG. 16, if the CoAP client had requested a group with context requirement, e.g. accuracy>90%, as its new attribute. Then the RD may support advanced group resource lookup based on such context requirements.

Table 2 shows examples options for enhanced CoAP group communications. The options shown are not exhaustive and can be extended. Further, the options introduced in Table 2 may be used individually or in combination.

TABLE 2

CoAP Options for Enhanced CoAP Group Communications

| New CoAP Options | Descriptions | Meaning in a Request | Meaning in a Response |
| --- | --- | --- | --- |
| serverIndicator | Indicate CoAP servers which shall or shall not send a unicast response to a CoAP client. | Indicate CoAP servers which shall or shall not send a unicast response to a CoAP client. | N/A |
| contextIndicator | Indicate context information or requirement associated with a resource. | Indicates context information which the CoAP client expects for each CoAP server, or the requirement for each CoAP server. | Indicate context information associated with the resource contained in the response message. | size equal to two, the RD may have responded to message 13 with denial to join group G1 in message 14.

Explicit server indication, implicit server indication, and context-aware RD management of group communications may be implemented separately or in any combination. For example, a multicast request may include both serverIndicator and contextIndicator fields. After receiving such a multicast request, a CoAP server may check both fields, as required, to determine whether it needs to send a response.

Similarly, after an RD establishes a context-aware group, e.g., by the methods discussed in regard to FIGS. 15 and 16, a CoAP client may still include a serverIndicator and/or a contextIndicator in its multicast request messages. A CoAP server receiving such a request message may process each received field separately but make a final response determination based on a combination of the explicit and implicit indications, in view of the group configuration information available to it.

In order to support explicit server indication, the standard CoAP RD protocols may be extended. For example, for each group resource created under "rd-group," an RD may maintain parameters such as an address type, a MID, a list of hash functions, and a group size. The address type parameter may be used to note the type of indication used from this group. For example, addrType=1 may be used to signify the use of explicit IP addresses, addrType=2 may be used to signify the use of member identifiers, and addrType=3 may be used to signify the use of a Bloom filter. Accordingly, the RD may maintain a MID for each group member. Similarly, the RD may maintain a list of hash functions applicable for all group members, e.g., for the support of a Bloom filter. The RD may maintain a group size. This may include both a current size and a requested, minimum, and/or maximum size.

Standard CoAP protocols may be extended to support RD-assisted context-aware group management. For example, an RD may register context information about a resource as new attributes or link formats for the resource. The RD may then support advanced resource lookup based on those new attributes or link formats. For example, "accuracy," "last update time," and "resource creation time" may be new link formats and attributes. For each group resource created under "rd-group", the RD may add a CoAP header options may be used to transmit a serverIndicator and/or a contextIndicator field. Server and context indications may also be transmitted in a query string in URI. In other words, parameters in serverIndicator and/or contextIndicator may be conveyed in a query string of a CoAP multicast request message. For example, a CoAP client may issue the following multicast requests:

GET CoAP://ip_multicast_address/temperature?serverFlag=TRUE&addrType=3&serverSet=a-Bloom-filter-value;

GET CoAP://ip_multicast_address/temperature?serverResProb=50%; and/or

GET CoAP://ip_multicast_address/temperature?contextType=accuracy&contextValue=90%&operator=bigger&responseFlag=TRUE.

Another potential extension to the standard CoAP protocols is to use one bit of the 8-bit "Code" field, e.g. the fourth bit, in a CoAP request message to indicate whether this request needs a CON response, e.g. if the fourth bit is 1, or NON response, e.g. if the fourth bit is 0.

The 6LoWPAN Neighbor Discovery Protocol may be extended to facilitate the use of Bloom filters. For example, where a Bloom filter technique is used for explicit server indication, each CoAP server within a group needs to know the corresponding hash functions. For the scenario where all CoAP servers belong to the same 6LoWPAN network, 6LoWPAN neighbor discovery protocols may be extended to convey the hash functions from 6LoWPAN border router to 6LoWPAN devices, e.g., to CoAP servers, and/or CoAP clients. Specifically, a 6LoWPAN border router and/or router may notify each device of those hash functions for evaluating whether the device belongs to the set of devices covered in a Bloom filter. Following router discovery procedures, e.g., as described above in reference to FIG. 7 and FIG. 8, the following two approaches may be used. First, the 6LoWPAN border router and/or router may include the list of hash functions in each Router Advertisement (RA), e.g., in messages 2 and 3 of FIG. 7. Second, alternatively, the list of hash functions may be contained in a Duplicate Address Confirmation (DAC) message and a Neighbor Advertisement (NA) message. In other words, 6LoWPAN border router or other routers sends the list of hash functions during address registration and duplicate address detection phase shown in FIG. 8.

Figure 17:
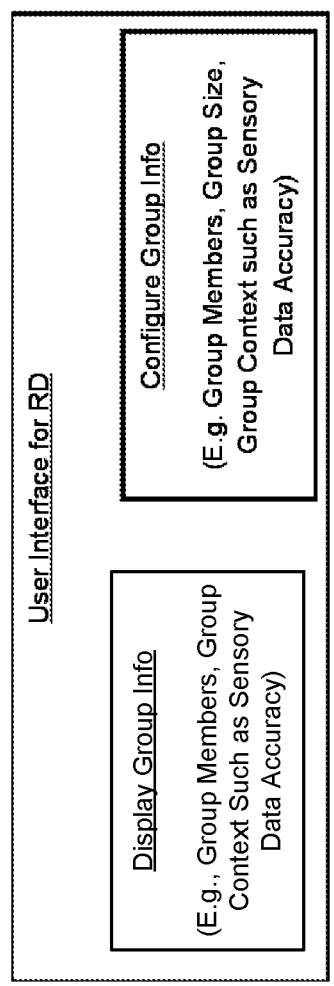
FIG. 17 illustrates an example user interface for a resource directory.
Figure 18:
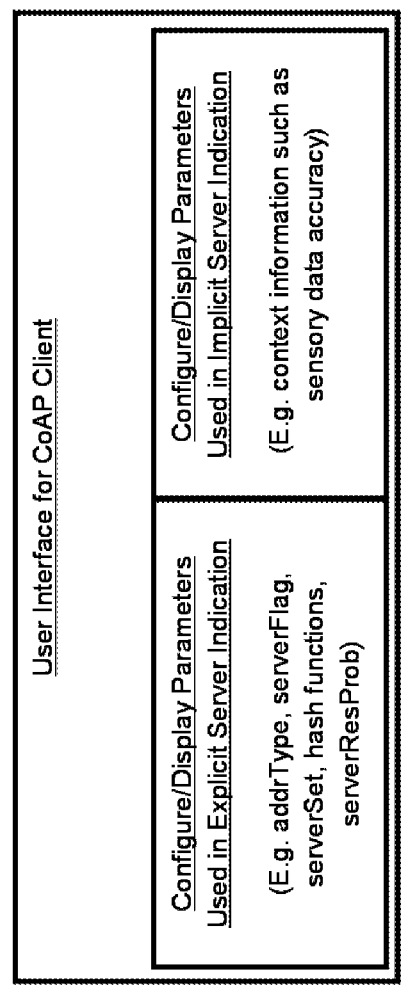
FIG. 18 illustrates an example user interface for a CoAP client.

FIG. 17 is an example of a user interface whereby a human user may display and adjust group-related information in RD-assisted context-aware group management in RD. FIG. 18 is an example of user interface whereby a human user of a CoAP client may display and adjust parameters used in explicit server indication and/or implicit server indication.

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to effect the methods described herein. As used herein, the terms "apparatus," "network apparatus," "node," "device," and "network node" may be used interchangeably.

Figure 19:
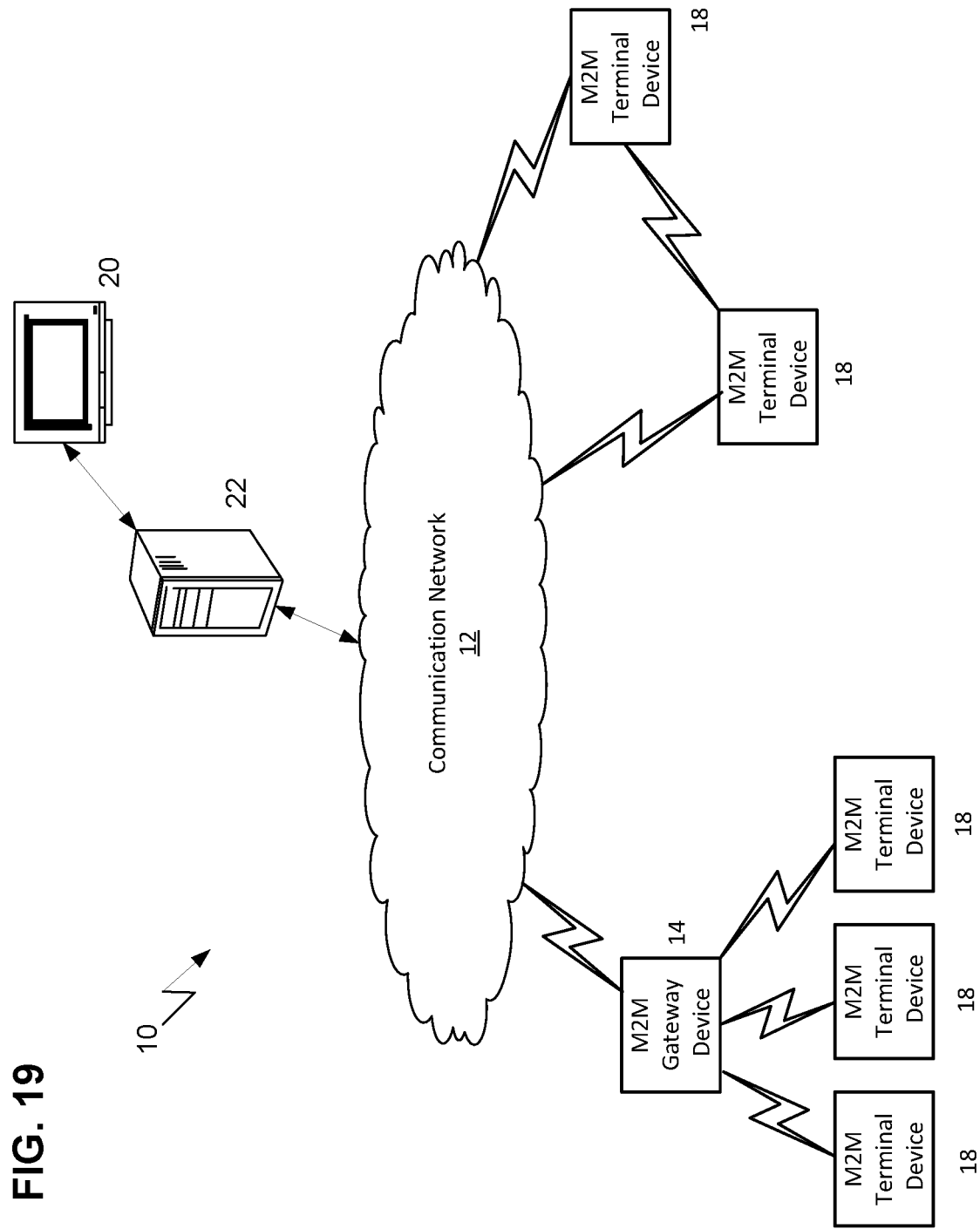
FIG. 19 is a system diagram of an example machine-to-machine (M2M), Internet of Things (IoT), or Web of Things (WoT) communication system in which one or more disclosed embodiments may be implemented.

As shown in FIG. 19, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different nodes (e.g., servers, gateways, device, and the like) of the network. For example, the Field Domain may include M2M gateways 14 and devices 18. It will be appreciated that any number of M2M gateway devices 14 and M2M devices 18 may be included in the M2M/IoT/WoT communication system 10 as desired. Each of the M2M gateway devices 14 and M2M devices 18 are configured to transmit and receive signals, using communications circuitry, via the communication network 12 or direct radio link. A M2M gateway 14 allows wireless M2M devices (e.g. cellular and non-cellular) as well as fixed network M2M devices (e.g., PLC) to communicate either through operator networks, such as the communication network 12 or direct radio link. For example, the M2M devices 18 may collect data and send the data, via the communication network 12 or direct radio link, to an M2M application 20 or other M2M devices 18. The M2M devices 18 may also receive data from the M2M application 20 or an M2M device 18. Further, data and signals may be sent to and received from the M2M application 20 via an M2M service layer 22, as described below. M2M devices 18 and gateways 14 may communicate via various networks including, cellular, WLAN, WPAN (e.g., Zigbee, 6LoWPAN, Bluetooth), direct radio link, and wireline for example. Exemplary M2M devices include, but are not limited to, tablets, smart phones, medical devices, temperature and weather monitors, connected cars, smart meters, game consoles, personal digital assistants, health and fitness monitors, lights, thermostats, appliances, garage doors and other actuator-based devices, security devices, and smart outlets.

Figure 20:
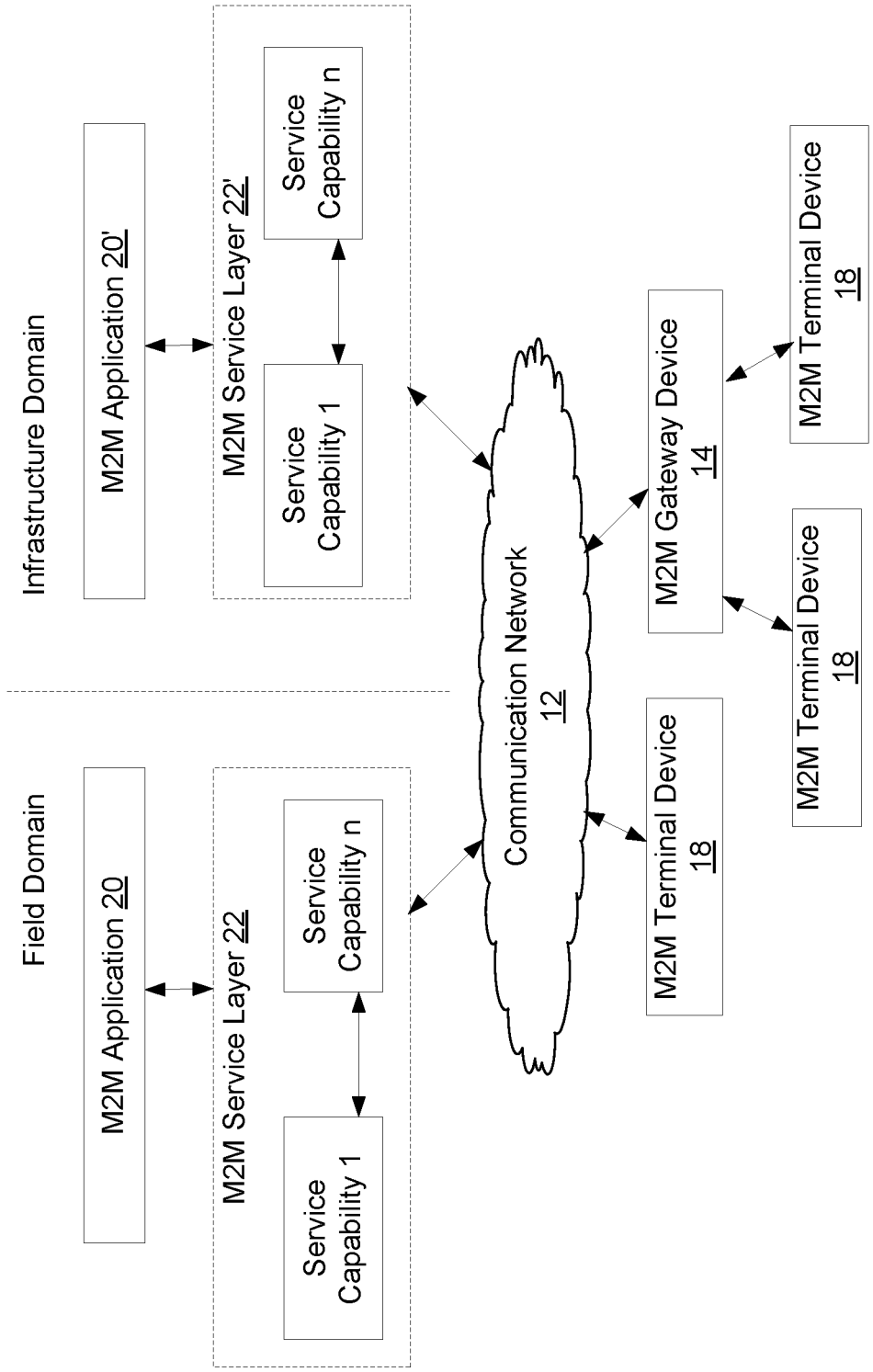
FIG. 20 is a system diagram of an example architecture that may be used within the M2M/IoT/WoT communications system illustrated in FIG. 19.

Referring to FIG. 20, the illustrated M2M service layer 22 in the field domain provides services for the M2M application 20, M2M gateways 14, and M2M devices 18 and the communication network 12. It will be understood that the M2M service layer 22 may communicate with any number of M2M applications, M2M gateways 14, M2M devices 18, and communication networks 12 as desired. The M2M service layer 22 may be implemented by one or more nodes of the network, which may comprise servers, computers, devices, or the like. The M2M service layer 22 provides service capabilities that apply to M2M devices 18, M2M gateways 14, and M2M applications 20. The functions of the M2M service layer 22 may be implemented in a variety of ways, for example as a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12' in the infrastructure domain. M2M service layer 22' also provides services for the M2M gateways 14 and M2M devices 18 in the field domain. It will be understood that the M2M service layer 22' may communicate with any number of M2M applications, M2M gateways and M2M devices. The M2M service layer 22' may interact with a service layer by a different service provider. The M2M service layer 22' may be implemented by one or more nodes of the network, which may comprise servers, computers, devices, virtual machines (e.g., cloud computing/storage farms, etc.) or the like.

Referring also to FIG. 20, the M2M service layers 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layers 22 and 22' also enable M2M applications 20 and 20' to communicate through various networks 12 and 12' in connection with the services that the service layers 22 and 22' provide.

The M2M applications 20 and 20' may include applications in various industries such as, without limitation, transportation, health and wellness, connected home, energy management, asset tracking, and security and surveillance. As mentioned above, the M2M service layer, running across the devices, gateways, servers and other nodes of the system, supports functions such as, for example, data collection, device management, security, billing, location tracking/geofencing, device/service discovery, and legacy systems integration, and provides these functions as services to the M2M applications 20 and 20'.

Generally, a service layer, such as the service layers 22 and 22' illustrated in FIGS. 19 and 20, defines a software middleware layer that supports value-added service capabilities through a set of Application Programming Interfaces (APIs) and underlying networking interfaces. Both the ETSI M2M and oneM2M architectures define a service layer. ETSI M2M's service layer is referred to as the Service Capability Layer (SCL). The SCL may be implemented in a variety of different nodes of the ETSI M2M architecture. For example, an instance of the service layer may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (e.g., service capabilities). An instantiation of a set of one or more particular types of CSFs is referred to as a Common Services Entity (CSE) which can be hosted on different types of network nodes (e.g. infrastructure node, middle node, application-specific node). The Third Generation Partnership Project (3GPP) has also defined an architecture for machine-type communications (MTC). In that architecture, the service layer and the service capabilities it provides are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or in some other node of a network, an instance of the service layer may be implemented as a logical entity (e.g., software, computer-executable instructions, and the like) executing either on one or more stand-alone nodes in the network, including servers, computers, and other computing devices or nodes, or as part of one or more existing nodes. As an example, an instance of a service layer or component thereof may be implemented in the form of software running on a network node (e.g., server, computer, gateway, device or the like) having the general architecture illustrated in FIG. 21 or FIG. 22 described below.

For example, the service layer may be a functional layer within a network service architecture. Service layers are typically situated above the application protocol layer such as HTTP, CoAP or MQTT and provide value added services to client applications. The service layer also provides an interface to core networks at a lower resource layer, such as for example, a control layer and transport/access layer. The service layer supports multiple categories of (service) capabilities or functionalities including a service definition, service runtime enablement, policy management, access control, and service clustering. Recently, several industry standards bodies, e.g., oneM2M, have been developing M2M service layers to address the challenges associated with the integration of M2M types of devices and applications into deployments such as the Internet/Web, cellular, enterprise, and home networks. A M2M service layer can provide applications and/or various devices with access to a collection of or a set of the above mentioned capabilities or functionalities, supported by the service layer, which can be referred to as a CSE or SCL. A few examples include but are not limited to security, charging, data management, device management, discovery, provisioning, and connectivity management which can be commonly used by various applications. These capabilities or functionalities are made available to such various applications via APIs which make use of message formats, resource structures and resource representations defined by the M2M service layer. The CSE or SCL is a functional entity that may be implemented by hardware and/or software and that provides (service) capabilities or functionalities exposed to various applications and/or devices (i.e., functional interfaces between such functional entities) in order for them to use such capabilities or functionalities.

Further, the methods and functionalities described herein may be implemented as part of an M2M network that uses a Service Oriented Architecture (SOA) and/or a Resource-Oriented Architecture (ROA) to access services.

Figure 21:
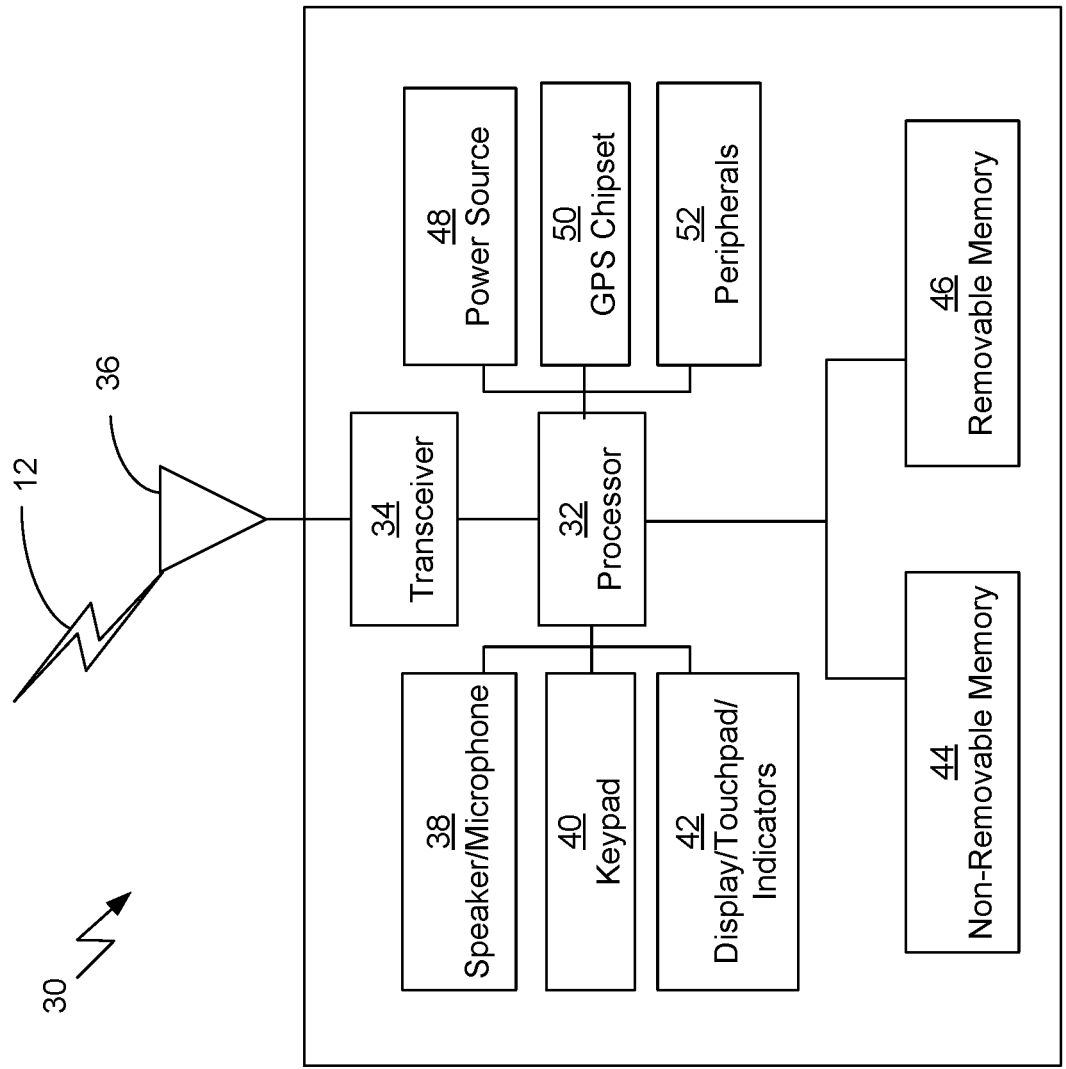
FIG. 21 is a system diagram of an example communication network node, such as an M2M/IoT/WoT device, gateway, or server that may be used within the communications system illustrated in FIGS. 19 and 20.

FIG. 21 is a block diagram of an example hardware/software architecture of a node of a network, such as one of the devices illustrated in FIG. 2-5, 7-11, or 13-16 which may operate as an M2M server, gateway, device, or other node in an M2M network such as that illustrated in FIGS. 19 and 20. As shown in FIG. 21, the node 30 may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The node 30 may also include communication circuitry, such as a transceiver 34 and a transmit/receive element 36. It will be appreciated that the node 30 may include any sub-combination of the foregoing elements while remaining consistent with an embodiment. This node may be a node that implements aspects of the selective response to multicast requests functionality described herein.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the node in order to perform the various required functions of the node. For example, the processor 32 may perform signal coding, data processing, power control, input/output processing, and/or any other functionality that enables the node 30 to operate in a wireless or wired environment. The processor 32 may run application-layer programs (e.g., browsers) and/or radio access-layer (RAN) programs and/or other communications programs. The processor 32 may also perform security operations such as authentication, security key agreement, and/or cryptographic operations, such as at the access-layer and/or application layer for example.

As shown in FIG. 21, the processor 32 is coupled to its communication circuitry (e.g., transceiver 34 and transmit/receive element 36). The processor 32, through the execution of computer executable instructions, may control the communication circuitry in order to cause the node 30 to communicate with other nodes via the network to which it is connected. In particular, the processor 32 may control the communication circuitry in order to perform the transmitting and receiving steps described herein, e.g., as described in reference to FIGS. 2, 4,5, 7-11, and 13-16 and in the claims. While FIG. 21 depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other nodes, including M2M servers, gateways, device, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 21 as a single element, the node 30 may include any number of transmit/receive elements 36. More specifically, the node 30 may employ MIMO technology. Thus, in an embodiment, the node 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the node 30 may have multi-mode capabilities. Thus, the transceiver 34 may include multiple transceivers for enabling the node 30 to communicate via multiple RATs, such as UTRA and IEEE 802.11, for example.

The processor 32 may access information from, and store data in, any type of suitable memory, such as the non-removable memory 44 and/or the removable memory 46. For example, the processor 32 may store session context in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the node 30, such as on a server or a home computer. The processor 32 may be configured to control lighting patterns, images, or colors on the display or indicators 42 to reflect the status of an M2M service layer session migration or sharing or to obtain input from a user or display information to a user about the node's session migration or sharing capabilities or settings. In another example, the display may show information with regard to a session state.

The processor 32 may receive power from the power source 48, and may be configured to distribute and/or control the power to the other components in the node 30. The power source 48 may be any suitable device for powering the node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the node 30. It will be appreciated that the node 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include various sensors such as an accelerometer, biometrics (e.g., finger print) sensors, an e-compass, a satellite transceiver, a sensor, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The node 30 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The node 30 may connect to other components, modules, or systems of such apparatuses or devices via one or more interconnect interfaces, such as an interconnect interface that may comprise one of the peripherals 52.

Figure 22:
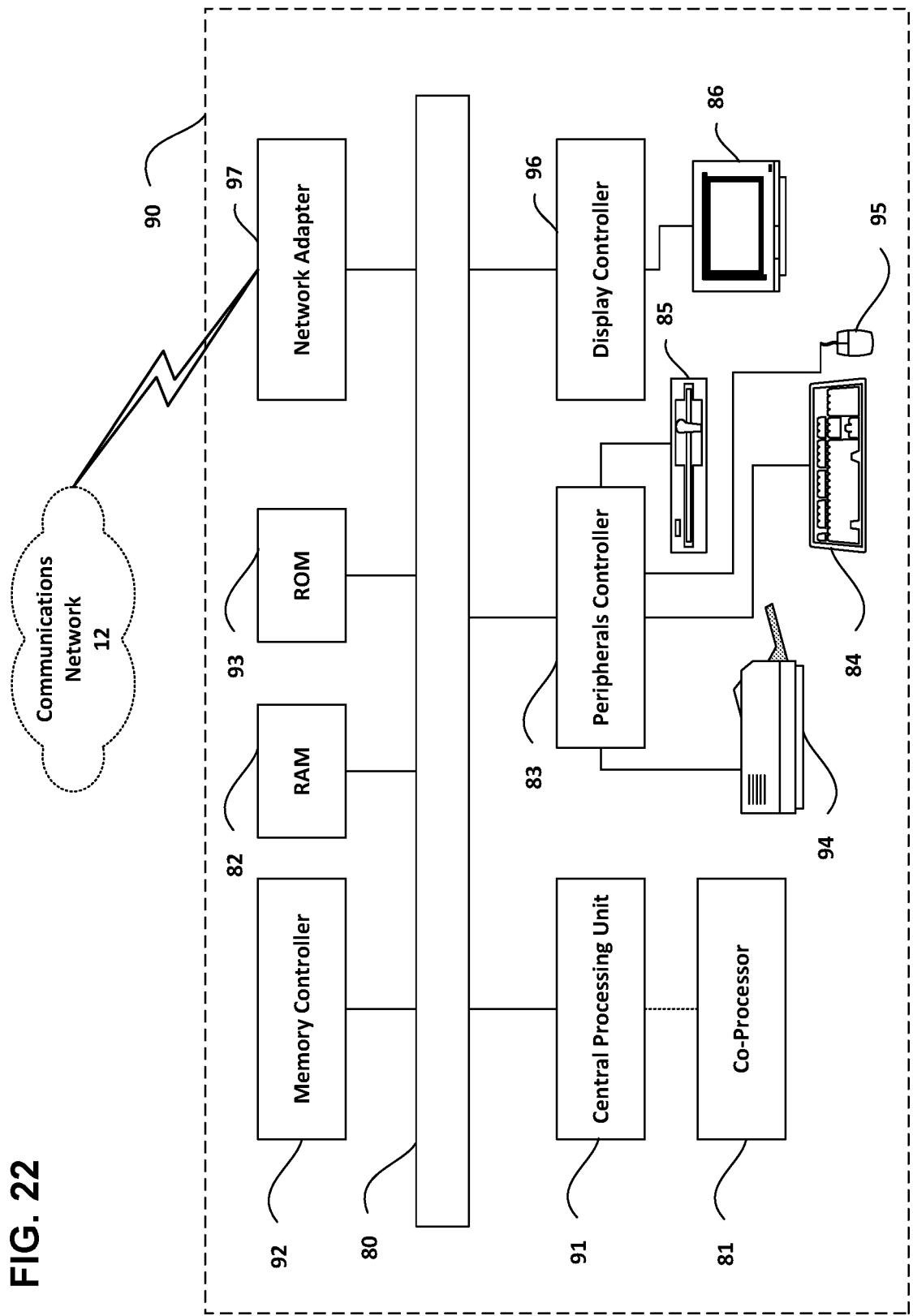
FIG. 22 is a block diagram of an example computing system in which a node of the communication system of FIGS. 19 and 20 may be embodied.

FIG. 22 is a block diagram of an exemplary computing system 90 which may also be used to implement one or more nodes of a network, such as the devices illustrated in FIG. 2, or 4-17, which may operate as an M2M server, gateway, device, or other node in an M2M network such as that illustrated in FIGS. 19 and 20. Computing system 90 may comprise a computer or server and may be controlled primarily by computer readable instructions, which may be in the form of software, wherever, or by whatever means such software is stored or accessed. Such computer readable instructions may be executed within a processor, such as central processing unit (CPU) 91, to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 and/or coprocessor 81 may receive, generate, and process data related to the disclosed systems and methods for E2E M2M service layer sessions, such as selective response to multicast requests.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adaptor 97, that may be used to connect computing system 90 to an external communications network, such as network 12 of FIG. 19 and FIG. 20, to enable the computing system 90 to communicate with other nodes of the network. The communication circuitry, alone or in combination with the CPU 91, may be used to perform the transmitting and receiving steps described herein (e.g., in FIGS. 5, 7-9, and 11-17) and in the claims.

It is understood that any or all of the systems, methods, and processes described herein may be embodied in the form of computer executable instructions (e.g., program code) stored on a computer-readable storage medium. Such instructions, when executed by a machine, such as a computer, server, M2M terminal device, M2M gateway device, or the like, perform and/or implement the systems, methods and processes described herein. Specifically, any of the steps, operations or functions described above may be implemented in the form of such computer executable instructions. Computer readable storage media include both volatile and nonvolatile, removable and non-removable media implemented in any method or technology for storage of information, but such computer readable storage media do not include signals. Computer readable storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other physical medium that can be used to store the desired information and that can be accessed by a computer.

In describing preferred embodiments of the subject matter of the present disclosure, as illustrated in the figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A Constrained Application Protocol, CoAP, server comprising a processor, a memory, and communication circuitry, wherein the CoAP server is connected to a communications network via its communication circuitry, and wherein the memory comprises computer-executable instructions which, when executed by the processor, cause the CoAP server:
   receive, from a CoAP client via multicast, a request pertaining to a resource, the request comprising a server indication, and a client context indication;
   evaluate the server indication to determine whether the CoAP server is an intended recipient of the request;
   evaluate the resource to determine whether the CoAP server has a matching resource;
   evaluate the client context indication to determine the matching resource meets a client context;
   if the CoAP server is the intended recipient of the request and the CoAP server has the matching resource meeting the client context, then send a response;
   if the CoAP server is not the intended recipient of the request or the CoAP server has no matching resource meeting the client context, then send no response.

2. The CoAP server of claim 1, wherein the server indication is an explicit server indication.

3. The CoAP server of claim 2, wherein the explicit server indication comprises an IP address or a server identifier.

4. The CoAP server of claim 2, wherein the explicit server indication comprises a Bloom filter.

5. The CoAP server of claim 1, wherein the server indication is the client context indication.

6. The CoAP server of claim 5, wherein the client context indication is selected from the list consisting of: an accuracy rating, a data type, an application, an operating system, a network location, a level of residual battery, a level of network and/or link congestion, a mobility status, a geolocation, a resource creation time, and a resource update time.

7. The CoAP server of claim 5, wherein the computer-executable instructions, further cause the CoAP server to:
   maintain a resource directory, the resource directory comprising attributes of a multicast group;
   add a group to the resource directory; and
   inform the CoAP client of the attributes of the group.

8. The CoAP server of claim 7, wherein the computer-executable instructions further cause the CoAP server to add the CoAP server to the group in the resource directory at a request of the CoAP server.

9. The CoAP server of claim 7, wherein the computer-executable instructions further cause the CoAP server to add the CoAP server to the group in the resource directory based on information about the CoAP server in the resource directory.

10. The CoAP server of claim 1, wherein the request further comprises a confirmation response indication and the instructions further cause the CoAP server to:
    evaluate the confirmation response indication to determine whether the response should be provided;
    if the CoAP server is the intended recipient of the request, the CoAP server has the matching resource meeting the client context, and the response should be provided, then send the response; and
    if the CoAP server is not the intended recipient of the request, the CoAP server has no matching resource meeting the client context, or the response should not be provided, then send no response.

11. A method performed by an apparatus of a communications network, the method comprising:
    receiving, from a CoAP client via multicast, a request pertaining to a resource, the request comprising a server indication, and a client context indication;
    evaluating the server indication to determine whether a CoAP server is an intended recipient of the request;
    evaluating the resource to determine whether the CoAP server has a matching resource;
    evaluating the client context indication to determine the matching resource meets a client context;
    if the CoAP server is the intended recipient of the request and the CoAP server has the matching resource meeting the client context, then sending a response;
    if the CoAP server is not the intended recipient of the request or the CoAP server has no matching resource meeting the client context, then sending no response.

12. The method of claim 11, wherein the server indication is an explicit server indication.

13. The method of claim 12, wherein the explicit server indication comprises an IP address or a server identifier.

14. The method of claim 12, wherein the explicit server indication comprises a Bloom filter.

15. The method of claim 11, wherein the server indication is the client context indication.

16. The method of claim 15, wherein the client context indication is selected from the list consisting of: an accuracy rating, a data type, an application, an operating system, a network location, a level of residual battery, a level of network and/or link congestion, a mobility status, a geolocation, a resource creation time, and a resource update time.

17. The method of claim 15, further comprising:
maintaining a resource directory, the resource directory comprising attributes of a multicast group;
adding a group to the resource directory; and
informing the CoAP client of the attributes of the group.

18. The method of claim 17, further comprising adding the CoAP server to the group in the resource directory at a request of the CoAP server.

19. The method of claim 17, further comprising adding the CoAP server to the group in the resource directory based on information about the CoAP server in the resource directory.

20. The method of claim 11, wherein the request further comprises a confirmation response indication, the method further comprising:
evaluating the confirmation response indication to determine whether the response should be provided;
if the CoAP server is the intended recipient of the request, the CoAP server has the matching resource meeting the client context, and the response should be provided, then sending the response; and
if the CoAP server is not the intended recipient of the request, the CoAP server has no matching resource meeting the client context, or the response should not be provided, then sending no response.

\* \* \* \* \*